(12) United States Patent
Abdelmalak et al.

(10) Patent No.: US 11,024,111 B2
(45) Date of Patent: *Jun. 1, 2021

(54) INTERACTIVE KIOSK FOR MOBILE ELECTRONICS

(71) Applicant: SwitchBin, Inc., Overland Park, KS (US)

(72) Inventors: George Greg Abdelmalak, Chatsworth, CA (US); Joshua Cole, Overland Park, KS (US)

(73) Assignee: Switchbin, Inc., Overland Park, KS (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/397,845

(22) Filed: Apr. 29, 2019

(65) Prior Publication Data
US 2019/0251777 A1    Aug. 15, 2019

Related U.S. Application Data

(63) Continuation of application No. 15/447,308, filed on Mar. 2, 2017, now Pat. No. 10,325,440.

(60) Provisional application No. 62/302,439, filed on Mar. 2, 2016.

(51) Int. Cl.
| | | |
|---|---|---|
| G07F 11/38 | (2006.01) | |
| G06Q 20/18 | (2012.01) | |
| G06Q 20/32 | (2012.01) | |
| G07F 7/06 | (2006.01) | |
| G07F 11/64 | (2006.01) | |

(52) U.S. Cl.
CPC ............. G07F 11/38 (2013.01); G06Q 20/18 (2013.01); G06Q 20/322 (2013.01); G07F 7/06 (2013.01); G07F 11/64 (2013.01)

(58) Field of Classification Search
CPC ...... G07F 11/62; G07F 15/006; G07F 11/165; G06Q 10/30
USPC .................................. 700/231–244
See application file for complete search history.

(56) References Cited

U.S. PATENT DOCUMENTS

| | | | | |
|---|---|---|---|---|
| 10,325,440 | B2 * | 6/2019 | Abdelmalak | G07F 11/64 |
| 2003/0204289 | A1 * | 10/2003 | Banerjee | G07F 11/62 |
| | | | | 700/241 |
| 2010/0088192 | A1 * | 4/2010 | Bowles | G06Q 30/0237 |
| | | | | 705/26.1 |

* cited by examiner

*Primary Examiner* — Timothy R Waggoner
(74) *Attorney, Agent, or Firm* — Hovey Williams LLP

(57) ABSTRACT

A kiosk for vending and reverse-vending of mobile electronic devices. The kiosk includes a case that defines an inner compartment configured to store mobile devices for vending. The case includes a front panel and a user interface is positioned along the front panel. The kiosk includes a vending bay and a storage bay configured to receive user mobile devices. The kiosk includes a diagnostic cable wire harness configured to be accessible at the storage bay. The kiosk includes a computing device having a communication element configured for communication with at least one carrier server for service activation and/or de-activation.

16 Claims, 15 Drawing Sheets

INTERACTIVE KIOSK FOR MOBILE ELECTRONICS

RELATED APPLICATIONS

The current patent application is a continuation patent application which claims priority benefit with regard to all common subject matter to identically-titled U.S. patent application Ser. No. 15/447,308, filed Mar. 2, 2017, which, itself, claims priority benefit to identically-titled U.S. Provisional Application Ser. No. 62/302,439, filed Mar. 2, 2016, and each of the foregoing applications is hereby incorporated by reference in its entirety into the current patent application.

BACKGROUND OF THE INVENTION

1. Field

The invention relates to systems, devices and methods for vending mobile electronic devices. More specifically, embodiments of the invention include systems, devices and methods for automating and integrating the evaluation, valuation, trade-in and sale of mobile electronic devices.

2. Discussion of Related Art

There are known devices and methods for the sale of new mobile devices. Further, there are known devices and methods for the valuation and purchase of used devices. Still further, there are methods of preparing devices for an intended use or purpose. However, these categories of services are presently provided by unsophisticated processes and via largely uncoordinated platforms. More particularly, these transactions and configurations are implemented using a variety of disparate manual, assisted, and automated processes carried out by and through a combination of skilled individuals and technological processes and interfaces.

Present systems and methods inevitably lead to redundant costs to the user and other parties, increases in the time and labor required to achieve such transactions, and increases in the likelihood of systematic and human errors as well as incompatibilities between the various technologies and/or platforms. Present systems and methods also require additional reconciliation "after-the-fact" in order to properly account for the various transactions, transfers, configurations and redisposition of mobile electronic devices according to common inventory and accounting practices. If such reconciliation is not timely, service interruption, record inaccuracy and billing problems, and other similar problems may develop. There is a need for an improved medium for conducting such transaction(s) relating to mobile electronic devices.

SUMMARY OF THE INVENTION

The following brief description is provided to indicate the nature of the subject matter disclosed herein. While certain aspects of the present inventive concept are described below, the summary is not intended to limit the scope of the present inventive concept. Embodiments of the present inventive concept provide an interactive kiosk including combined hardware and software features configured for vending, reverse-vending, configuration of, content/contact data transfer to/from and/or diagnostic services for mobile electronics devices. Embodiments of the present inventive concept include a system for provision of these services. The present inventive concept addresses one or more of the deficiencies of conventional technologies and platforms such as those previously set forth herein.

The aforementioned may be achieved in one aspect of the present inventive concept by providing a kiosk for vending and reverse-vending of mobile electronic devices. The kiosk includes a case that defines an inner compartment configured to store mobile devices for vending. The case includes a front panel and a user interface is positioned along the front panel. The kiosk includes a vending bay and a storage bay configured to receive user mobile devices. The kiosk includes a diagnostic cable wire harness configured to be accessible at the storage bay. The kiosk includes a computing device having a communication element configured for communication with at least one carrier server for service activation and/or de-activation.

The aforementioned may be achieved in another aspect of the present inventive concept by providing a computer-implemented method for reverse-vending a mobile electronic device and completing a sale transaction at a kiosk. The method includes establishing a data connection with the mobile electronic device and executing a diagnostic application. The method further includes determining, from execution of the diagnostic application, at least one characteristic of the mobile electronic device and comparing at least one characteristic of the mobile electronic device against an electronic pricing sheet to generate a purchase offer for the mobile electronic device based at least in part on the comparison against the electronic pricing sheet. The method still further includes generating a sale offer for display at the kiosk and applying the purchase offer as a credit toward the sale offer in connection with completion of a commercial transaction.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present inventive concept are described in detail below with reference to the attached drawing figures, wherein.

Figure 1:
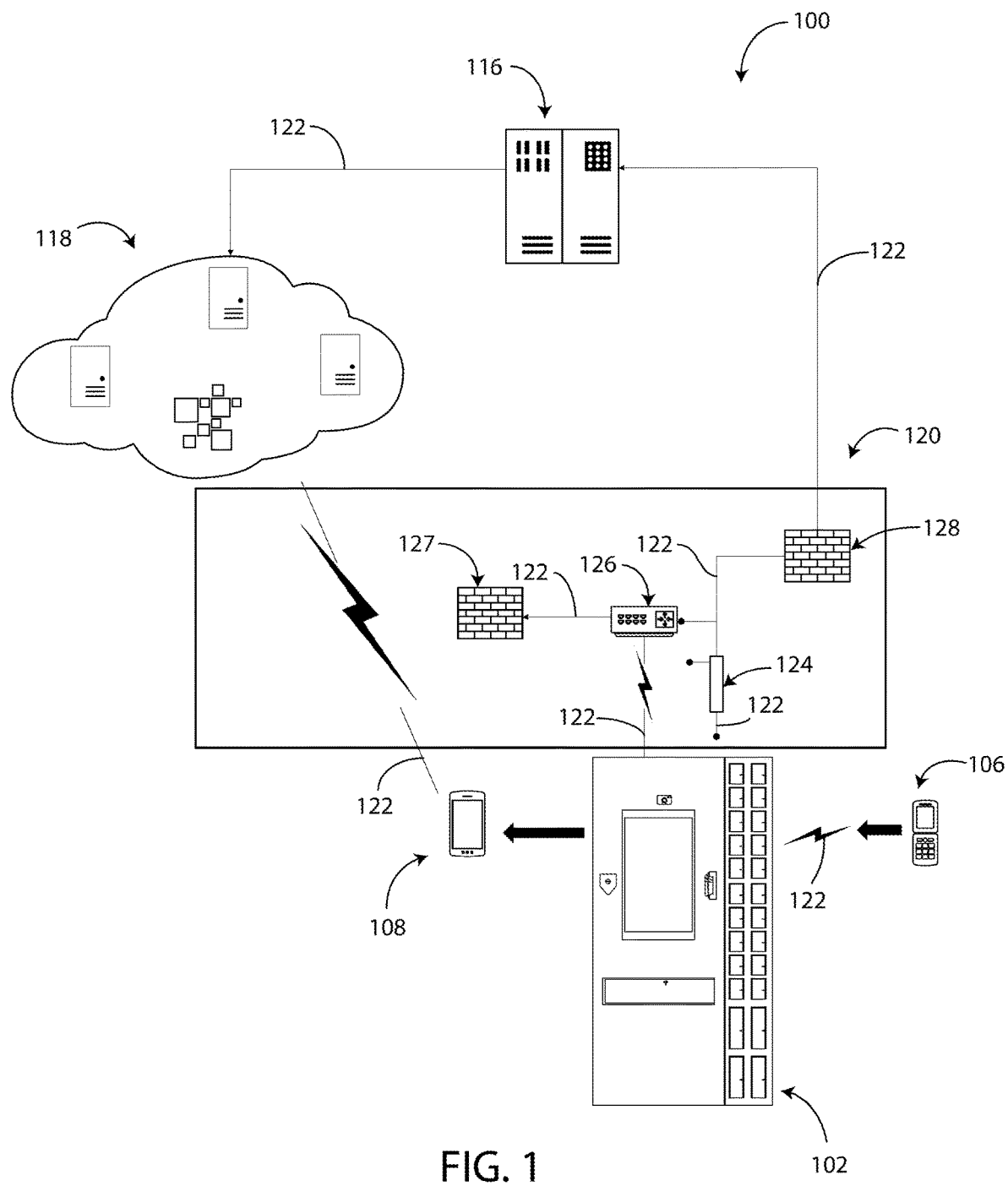
FIG. 1 is a schematic view of a system for conducting a transaction via a kiosk according to an embodiment of the present inventive concept.

The drawing figures do not limit the present inventive concept to the specific embodiments disclosed and described herein. The drawings are not necessarily to scale, emphasis instead being placed upon clearly illustrating the principles of the present inventive concept.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A system according to embodiments of the present inventive concept may include means for: vending one or more types of mobile electronics devices, each of which may require any of a variety of activation steps to be performed; recording and transmitting identifying and/or billing information for each vended mobile device and its associated vendee or user to enable the provision of third party services (such as carrier services) to such user(s); setting up and/or configuring the vended mobile electronics device(s), which may be governed by standardized policies developed for use specifically with kiosks according to embodiments of the present inventive concept; transferring personal data to and/or from the mobile electronics devices; evaluating the worth and suitability for service of pre-owned mobile electronic devices; and transferal of content, settings, and other parameters to and from mobile electronic devices, and to perform various other functions described herein.

As a particular illustrative example, in the wireless phone industry a kiosk according to embodiments of the present inventive concept may be utilized within mobile carrier and third party retail environments, or as stand-alone units. A kiosk may be branded to promote retention for specific carriers, or may be brand-agnostic to offer transactions from any provider or carrier. For instance the kiosk may enable cross-carrier trade-in via third party trade-in partners, original equipment manufacturers, first party operating system vendors or the like. It could also allow retrieval of inventory that correlates to an online purchase.

More broadly, it is also envisioned that kiosks according to embodiments of the present inventive concept may vend and/or reverse-vend other consumer or commercial products and mobile electronic devices. Preferably, such mobile electronic devices are of the type commonly used in conjunction with one or more data services, are configured for communications network connectivity, and/or are subject to subscription or authorization-based access or services. Examples include laptops, eReaders, tablets, industrial and commercial devices, configurable smart power tools, equipment that is physically leased but which requires also a separately charged usage or access based fee, or other devices such as those which require activation, authorization, or configuration prior to or during usage.

Still more broadly, a plurality of distributed kiosks may pool data generated through vending and reverse-vending mobile electronic devices to more effectively control licensed content. More particularly, the duration and nature of use of licensed content—such as software, electronic manuscripts, media, or other controlled assets—may be recorded through tracking such mobile electronic device(s) and/or content access data. In certain embodiments, licensed content may be made available exclusively through use of specialized readers or applications and/or via streaming functionality, such that control over access and use may be realized through issuing instructions to prevent or restrict access to the specialized application and/or through simply restricting or preventing streaming of the licensed content. It is foreseen that mobile electronic devices vended or reverse-vended according to embodiments of the present inventive concept may be leased for temporary use, for example, during the term in which a user is licensed to use such content, and that such a mobile electronic device may be configured to provide a notification to the user when reverse-vending becomes appropriate based on the expiration of such license(s).

Exemplary System

Turning to FIG. 1, a system 100 is illustrated that includes an automated kiosk 102 according to an embodiment of the present inventive concept. The kiosk 102 includes an interactive user interface 104 through which users may conduct multiple complex transactions without assistance or intervention from customer service personnel or other skilled participants. It is foreseen that ancillary and/or supporting services may, however, be provided by customer service personnel or the like, preferably from a remote location, without departing from the spirit of the present inventive concept.

Figure 3:
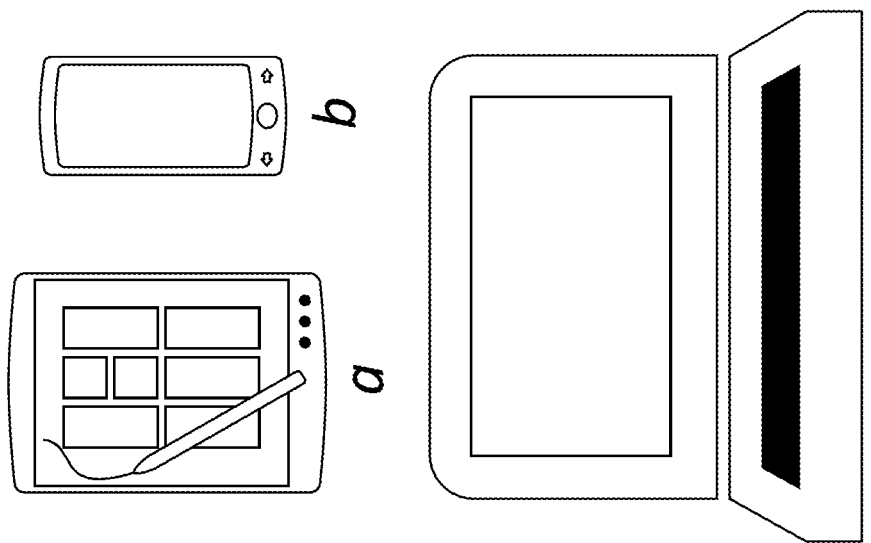
FIG. 3 illustrates exemplary mobile electronic devices for evaluation, trade/in and/or purchase at the kiosk of FIG. 1.

The kiosk 102 provides automated point of sale services, described in more detail below, relating to mobile electronics devices. More particularly, the kiosk 102 preferably is configured to at least temporarily receive pre-owned user devices 106, for example where the user seeks a trade-in, and to vend inventoried user devices 108, for example where the user seeks to purchase a new device or an inventoried pre-owned device. Exemplary types of user devices—namely, tablet a, mobile phone b and laptop computer c—are illustrated in FIG. 3, it being understood that a wide variety of mobile electronics devices may be evaluated and/or exchanged at the kiosk without departing from the spirit of the present inventive concept.

Figure 2:
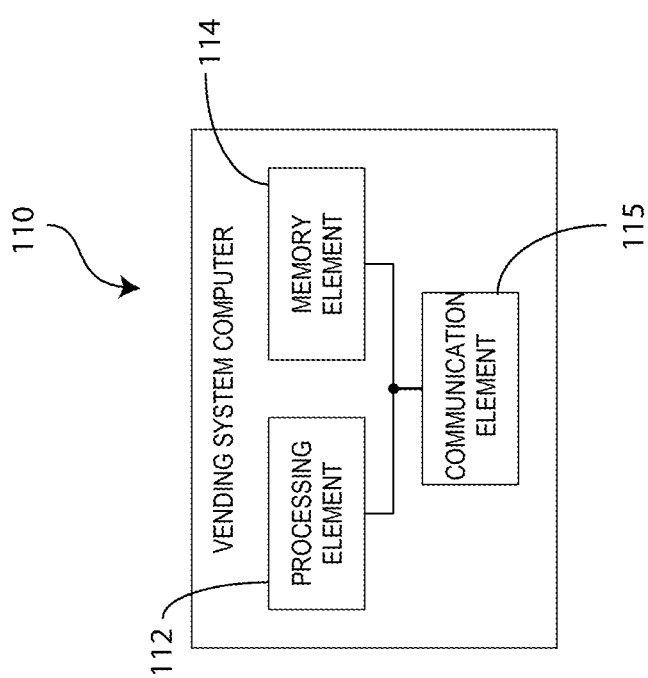
FIG. 2 illustrates various exemplary components of a computing device of the kiosk of FIG. 1, shown in block schematic form.
Figure 4:
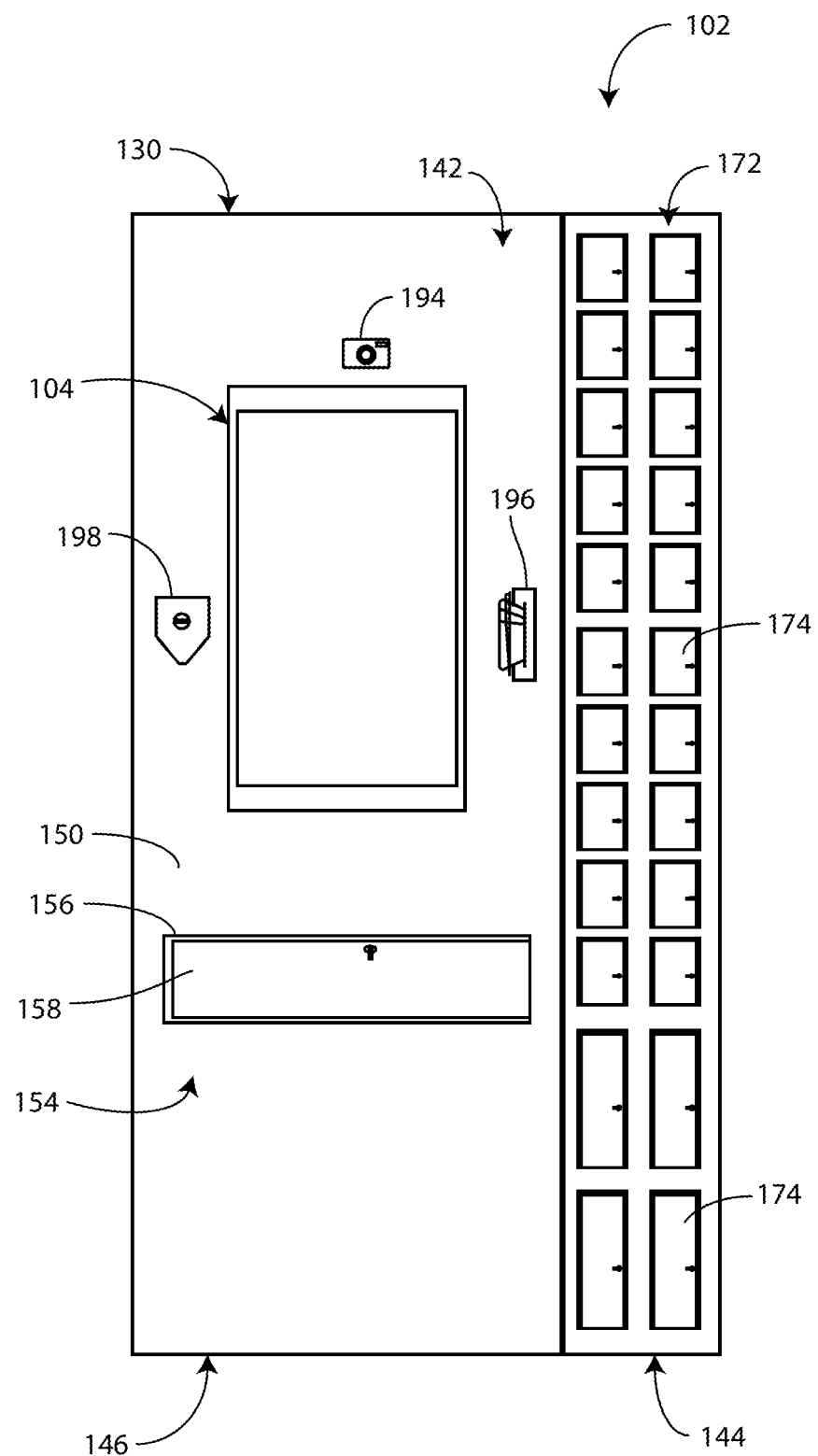
FIG. 4 is a front view of the kiosk of FIG. 1.
Figure 5:
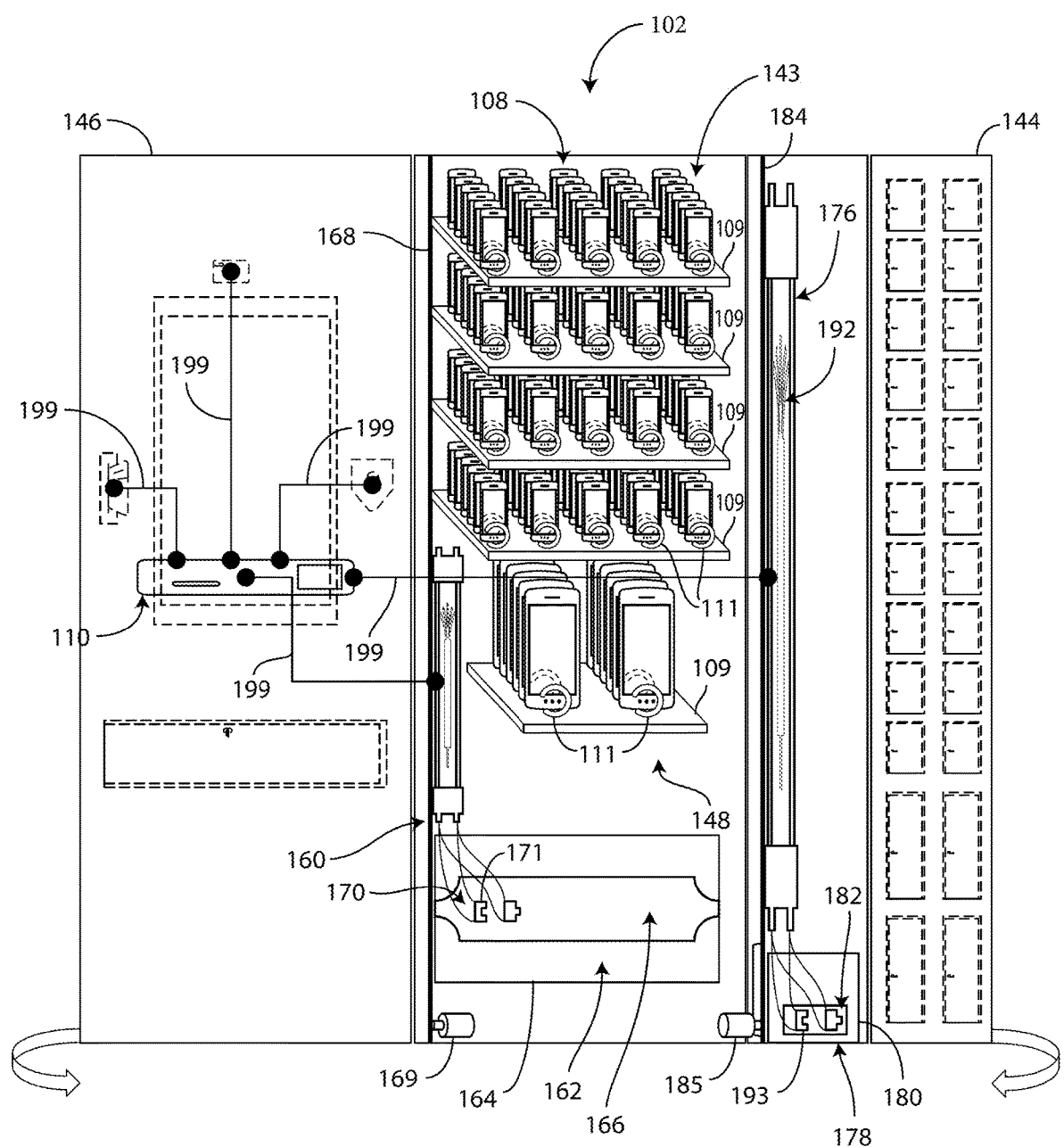
FIG. 5 is a front schematic view of the kiosk of FIG. 1 having front panels swung open to reveal internal components of the kiosk.
Figure 6:
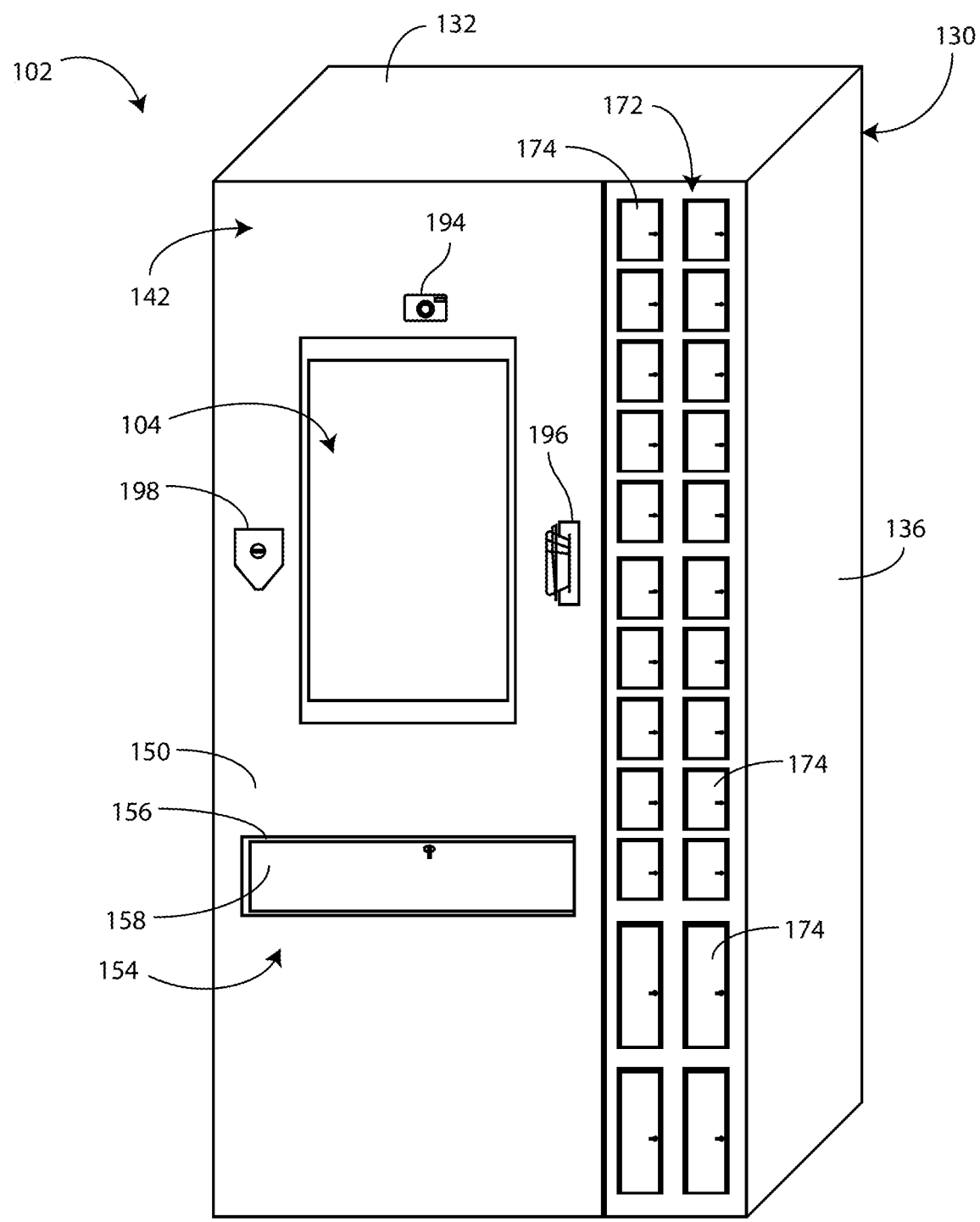
FIG. 6 is an elevated perspective view of the kiosk of FIG. 1.
Figure 7:
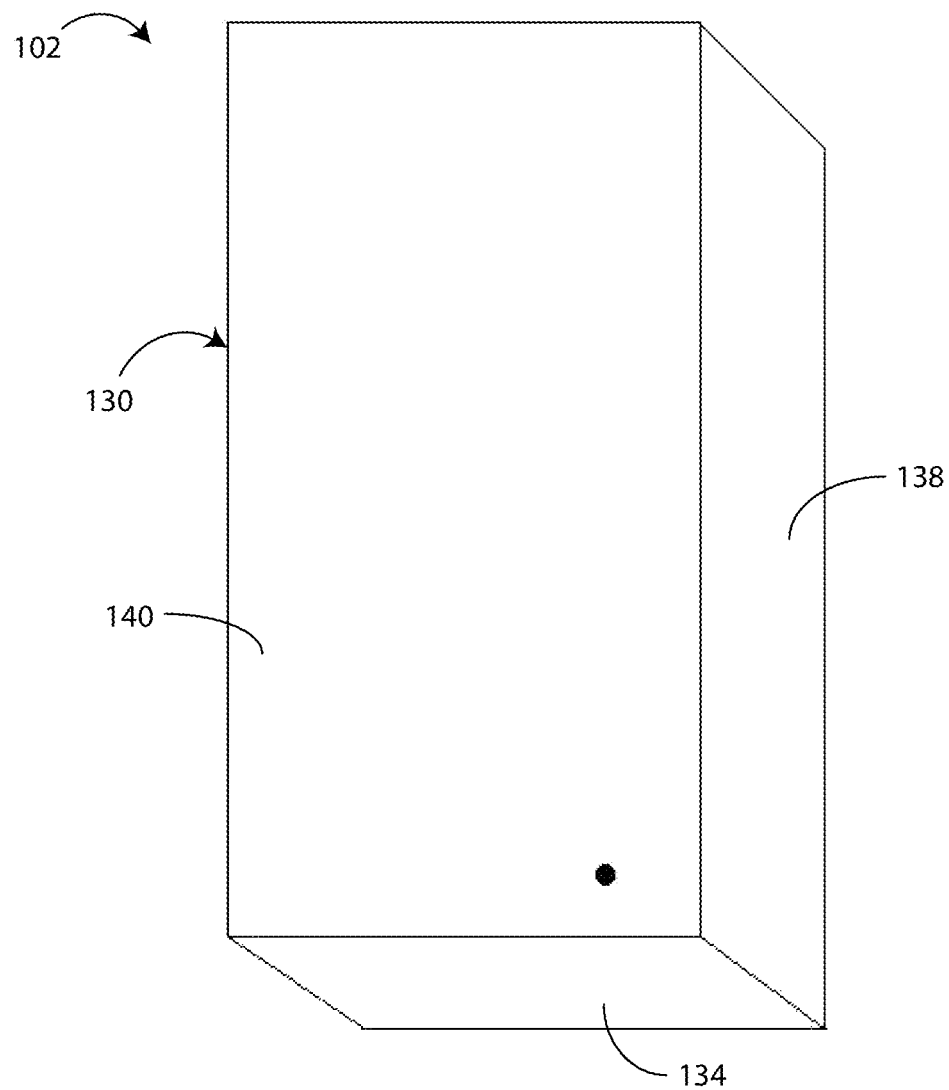
FIG. 7 is a bottom and rear perspective view of the kiosk of FIG. 1.

The kiosk 102 preferably includes at least one linking means—for example a wireless transceiver (see communication element 115 of FIG. 2) and/or an electrical connector (see diagnostic cable wire harness 168 of FIG. 5) including at least one data cable having a terminal comprising a plug configured to mate with corresponding data port(s) of at least one type of mobile device—for data exchange with the mobile devices 106, 108. As used herein, "data" is used broadly to refer to commands, instructions, personal information, device information, inventory information, account information, system configurations and/or settings, and any other information capable of being transmitted via a telecommunications network and/or stored on a mass storage device.

The kiosk 102 preferably also includes a computing device 110. (See FIG. 2) Broadly, the computing device 110 generally retains electronic data and may respond to requests to retrieve data, as well as to store data. The computing device 110 may be embodied by general-purpose computers, computer control boards, application servers, database servers, file servers, gaming servers, mail servers, print servers, web servers, or the like, or combinations thereof. Furthermore, the computing device 110 may include a plurality of servers, virtual servers, or combinations thereof. The computing device 110 may be configured to include or execute software, such as file storage applications, database applications, email or messaging applications, web server applications, diagnostics applications or the like, which collectively may be referred to herein as "kiosk software application(s)" when referring to functions specified herein. It should be noted that the "kiosk software application" may include application software and/or systems software or the like without departing from the spirit of the present inventive concept.

More particularly, in a preferred embodiment the computing device 110 includes a processing element 112 for executing the kiosk software application. The kiosk software application may be stored in a memory element 114, along with various data described herein. The kiosk software application may be embodied on a machine-readable medium or in a transmission signal. The kiosk software application may include instructions to be executed by the processing element 112 for controlling the various moving components (discussed below) of the kiosk 102 and/or for performing the steps described herein. The computing device 110 may implement instructions generated at the kiosk 102 and/or received from an external source (such as a third party system discussed below) to perform the services and method steps of embodiments of the present inventive concept. The kiosk software application may contain instructions for automatically configuring and/or evaluating mobile electronic devices 106, 108, enabling and/or carrying out portions of payment transactions, vending and/or reverse-vending mobile electronics devices 106, 108, and/or activating and defining and/or de-activating telecommunications carrier service plans associated with such mobile electronics devices 106, 108, all in accordance with and/or as fairly understood from the exemplary embodiments and methods described herein.

Additionally or alternatively, the processing element 112 may be configured to execute one or more software applications independent from, together with and/or as part of the kiosk software application, with such application(s) containing and/or providing for implementation of instructions for managing inventory and/or carrying out diagnostics/evaluation, configuration, vending, reverse-vending and/or content/contact data transfer processes on personal mobile electronics devices 106, 108. Such applications may also contain and/or provide for implementation of instructions for initiating, tracking and/or completing payment transactions. The processing element 112 is preferably configured to direct the memory element 114 to store, and/or to direct the communications element 115 (discussed below) to transmit to external databases, data for tracking changes in internal inventory, overall inventory figures and metadata, and/or other inventory data, preferably in a structured format. Additionally, the processing element 112 is preferably configured to direct the memory element 114 to store, and/or to direct the communications element 115 to transmit to external databases, data comprising records regarding any and all functions performed by the kiosk 102 and/or data received at or provided by the kiosk 102, such as payment records and/or sync records discussed in more detail below.

The processing element 112 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 112 may generally execute, process, or run instructions, code, code segments, software, firmware, programs, applications, apps, modules, agents, processes, services, daemons, or the like. The processing element 112 may also include hardware components such as finite-state machines, sequential and combinational logic, and other electronic circuits that can perform the functions necessary for the operation of the current invention. The processing element 112 may be in communication with the other electronic components through serial or parallel links that include address busses, data busses, control lines, and the like.

The memory element 114 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 114 may be embedded in, or packaged in the same package as, the processing element 112. The memory element 114 may include, or may constitute, a "computer-readable medium." The memory element may store the instructions, code, code segments, software, firmware, programs, applications, apps, modules, agents, services, daemons, or the like that are executed by the processing element 112. The memory element 114 may also store settings, data, documents, sound files, photographs, movies, images, databases, and the like.

The computing device 110 also includes a communication element 115 which generally allows communication with external systems or devices, such as via communication network 120 (discussed below), wireless communication and/or data transmission over one or more direct or indirect radio links between devices. The communication element 115 may include signal or data transmitting and receiving circuits, such as antennas, amplifiers, filters, mixers, oscillators, digital signal processors (DSPs), and the like. The communication element 115 may establish communication wirelessly by utilizing RF signals and/or data that comply with communication standards such as cellular 2G, 3G, 4G, or 5G, WiFi, WiMAX, LTE, Bluetooth™ and the like, or combinations thereof. In addition, the communication element 115 may utilize communication standards such as ANT, ANT+, Bluetooth™ low energy (BLE), the industrial, scientific, and medical (ISM) band at 2.4 gigahertz (GHz), or the like.

Alternatively or in addition, the communication element 115 may establish communication through electrical connectors or couplers that receive metal conductor wires or cables which are compatible with networking technologies, such as Ethernet, and/or through a diagnostic cable wire harness of the kiosk (discussed below) and/or additional ports for wired connection to mobile electronics devices 106, 108. In certain embodiments, the communication element 115 may also couple with optical fiber cables. The communication element 115 may be in communication with the processing element 112 and the memory element 114, again such as via wired connection, wireless communication and/or data transmission over one or more radio links. The communication element 115 may establish communication with all or some of a variety of modular components of the kiosk 102 and/or with a variety of mobile electronic devices 106, 108 via one or more of the foregoing wired and/or wireless means, and may alternately rely on the various means as necessary or expedient, without departing from the spirit of the present inventive concept.

Returning to discussion of the system 100 more broadly, the services provided by the kiosk 102 during a given user session are preferably determined, at least generally, by input from and selections of the user, as described in more detail below. The input and selections may be provided at the common user interface 104 and/or remotely. Remote input for use at the kiosk 102 may be provided via mobile applications and/or web based applications or the like with which the user interacts, and in some cases may be provided by third party systems such as those controlled by telecommunications carriers. For instance, the kiosk 102 is preferably configured to link with remote data sources to retrieve data and user input that may streamline the provision of services upon arrival and/or while at the kiosk 102. Data may be exchanged with a plurality of remote devices, and data aggregated from the plurality of remote devices and/or from the kiosk 102 may direct the composition and progression of services provided by the kiosk 102.

The kiosk 102 is also preferably configured to provide one or more services described herein by accessing pre-programmed instructions and/or stored data specific to individual users. For example, such individualized data may comprise transactional or other instructions received from a telecommunications carrier or service provider that are intended to govern certain aspects of transactions involving the provider's customers. For another example, such data may relate more specifically to an individual's account history, device history, preferences or other individualized historical data. More particularly, the kiosk 102 may access an individual user's personal profile to help inform the provision of services. The user profile may be generated based on past interactions with kiosks 102 and/or may be or be based on data obtained from third parties such as the aforementioned service providers. Accessing user information, event history, account settings, device settings, preferences and other data without requiring such data to be input in connection with each transaction may increase the efficiency with which the kiosk 102 provides services.

In keeping with the discussion above, the kiosk 102 may receive data from, and may upload data to, third party systems. For instance, the kiosk 102 may interrogate third party databases—following authentication and access authorization, where applicable—to retrieve settings and/or parameters applicable to a proposed transaction, device, service and/or user. The kiosk 102 may also upload user data/requests to a third party system and receive applicable settings and/or parameters generated based thereon. Such third party systems may be controlled by, for example, service providers, employers, account holders other than the user, sellers, manufacturers, and entities with legal authority relating to the user(s).

Data may be exchanged in embodiments of the present inventive concept via telecommunications infrastructure and communication networks. For instance, returning briefly to the exemplary system 100 of FIG. 1, data may be exchanged via a communication network 120: between the kiosk 102 and remote carrier servers 116, 118; between the kiosk 102 and devices 106, 108; and/or between the devices 106, 108 and carrier servers 116, 118. Such data may, for example, enable account activation and/or deactivation in relation to particular mobile device(s) 106, 108 and/or activation/deactivation of particular features or aspects of services provided under such account(s). The data may also comprise user information, event history, account settings, device settings, preferences and other data supporting performance of services by the kiosk 102 and/or telecommunications service providers.

The kiosk 102 and each of the mobile electronic devices 106, 108 may be configured to send data to and/or receive data from one another and/or carrier servers 116, 118 directly and/or via the communication network 120 using one or more suitable communication protocols, which may be the same communication protocols or different communication protocols as one another. To provide an example, the mobile electronic devices 106, 108 may be configured to communicate with one another and/or with the kiosk 102 via a direct radio link, which may utilize, for example, a Wi-Fi direct protocol, an ad-hoc cellular communication protocol, or the like.

For another example, each of the mobile electronic devices 106, 108 and/or the kiosk 102 may be configured to communicate indirectly with one another and/or any suitable device such as remote third party server(s) via communications over the links comprising communication network 120. The communication network 120 may include local area networks, metro area networks, wide area networks, cloud networks, the Internet, cellular networks, plain old telephone service (POTS) networks, and the like, or combinations thereof. The communication network 120 may be wired, wireless, or combinations thereof and may include components such as modems, gateways, switches, routers, hubs, access points, repeaters, towers, and the like. The mobile electronic devices 106, 108 and/or the kiosk 102 may connect to the communication network either through wires, such as electrical cables or fiber optic cables, or wirelessly, such as radio frequency (RF) communication using wireless standards such as cellular 2G, 3G, 4G, or 5G Institute of Electrical and Electronics Engineers (IEEE) 802.11 standards such as WiFi, IEEE 802.16 standards such as WiMAX, Bluetooth™, or combinations thereof.

The communication network 120 may be implemented as any suitable network configured to facilitate communications between the mobile electronic devices 106, 108, kiosk 102 and/or third party computer system(s). For example, the communication network 120 may include one or more telecommunication networks, nodes, and/or links used to facilitate data exchanges between one or more devices, and may facilitate a connection to the Internet for devices configured to communicate with the communication network 120. The communication network 120 may include any suitable number of interconnected network components that form an aggregate network system, such as dedicated access lines, plain ordinary telephone lines, satellite links, cellular base stations, a public switched telephone network (PSTN), or the like, or any suitable combination thereof. The communication network 120 may include, for example, a proprietary network, a secure public internet, a secure electronic communication network, a mobile-based network, a virtual private network, or the like.

In aspects in which the communication network 120 facilitates a connection to the Internet, data communications may take place over the communication network 120 via one or more suitable Internet communication protocols. For example, the communication network 120 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Returning to FIG. 1, in a preferred embodiment, exemplary components of a communication network 120 include a link 122, which may be a wireless connection, between a newly-vended device 108 and one or both of carrier servers 116, 118, for example to enable configuration and setup of the new device 108. Exemplary components of the preferred communication network 120 may also include a link 122 between the kiosk 102 and a network interface controller (NIC) 124, the NIC being configured to manage communications with a local network controller 126 and/or an intranet network 128. The kiosk 102 may also connect to the local network controller 126 via a Wifi link or the like 122. The local network controller 126 may provide a link 122 between the kiosk 102 and one or both of carrier servers 116, 118 via the Internet 127. The intranet network 128 may also serve as a means for linking the kiosk 102 to the servers 116, 118. In this manner or in similar configurations, the communication network 120 may connect the kiosk 102 to OS-specific cloud based features (e.g. Google® account and iCloud® data), enterprise/government/organizational policy servers, third party sync services, carrier services, and the like. It is foreseen that, in an embodiment, facilitating exchanges with a kiosk may include or consist of private, local and/or isolated communication networks—for example existing behind a firewall or otherwise being isolated from public communication network(s)—without departing from the spirit of the present inventive concept.

In this manner, embodiments of the invention may provide an automated and relatively comprehensive retail point of sale for mobile electronics. Namely, a preferred embodiment of the kiosk 102 is configured to automatically conduct sale, purchase, evaluation, trade-in, activation, and configuration services within a single user session or transaction. Improvements over existing systems and methods may include broadening and coordinating a variety of functions. Such integrated functions may include diagnostics of existing hardware, content transfer, configuration recreation, integration of processes for providing trade-in credit and/or charging for purchase of a new mobile electronic device. In a preferred embodiment, each such function may be combined within a single transaction, if desired. This may reduce cost to the operator and user, take less time, and result in fewer vectors for error by removing post-transaction reconciliation concerns.

Exemplary Kiosk

Turning to FIGS. 4-7, the kiosk 102 includes a case 130 having a top panel 132, a bottom panel 134, right- and left-side panels 136, 138, a back panel 140 and at least one front panel 142, together defining an interior 143. Preferably, the at least one front panel 142 comprises two movable front panels 144, 146. (See FIG. 5) Front panels 144, 146 may be swingable about hinges (not shown) positioned adjacent front edges of, respectively, right- and left-side panels 136, 138. The panels 144, 146 preferably swing out to reveal an inner compartment 148 of the interior 143. It is foreseen that the front panel(s) may be sliding, retractable, or the like without departing from the spirit of the present inventive concept. Further, it is foreseen that only one front panel may be configured for movement with respect to the rest of a kiosk's case without departing from the spirit of the present inventive concept. Still further, it is foreseen that, in certain embodiments, one or more of the side panels and back panel may be movable to provide maintenance and/or inventory replenishment access to the inner compartment in addition to or in lieu of a front panel without departing from the spirit of the present inventive concept.

The user interface 104 is preferably embedded within and/or positioned along a front face 150 of the front panel 142. The user interface 104 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The user interface 104 may also include data input components such as a keyboard, a mouse, or other peripheral components and communication components that provide wired or wireless communication. The user interface 104 may possess a square or a rectangular aspect ratio and may be viewed in either a landscape or a portrait mode. Preferably, the user interface 104 includes a touchscreen. In various embodiments, the user interface 104 may include a touch screen occupying the entire screen or a portion thereof. The touch screen may allow the user to interact with the user interface 104 by physically touching, swiping, or gesturing on areas of the screen.

Inventoried devices 108 are stored in the inner compartment 148 of the kiosk 102. The inner compartment 148 is preferably configured to store the inventoried device 108, for example because the inventoried devices 108 are stored along racks 109 in rows and multiple layers according to, for example, device type. The kiosk 102 may also include rotating bays or other organizing structures on which the inventoried devices 108 may be placed (not shown). The inventoried devices 108 are cycled toward outer positions along each row for dispensation by motor-driven spirals 111, which are preferably powered and controlled under the direction of the computing device 110, for example via wired connections thereto (not shown). It is foreseen that conveyors or other known devices for cycling inventoried products toward outer positions along rows for dispensation may be utilized in various embodiments without departing from the spirit of the present inventive concept. The inventoried devices 108 are preferably wrapped—individually or in groups—in packaging (not shown) to prevent damage during dispensing operations.

The kiosk 102 also includes a vending bay 154 for dispensing inventoried devices 108. The vending bay 154 includes a casing 156 embedded in left-side panel 146. The casing 156 defines a compartment for temporarily housing at least one inventoried device 108 during a dispensing operation. The vending bay 154 includes a swinging door 158 for shielding the vending bay 154. The door 158 may be hinged adjacent a top edge. A user may manually press the swinging door 158 generally in the direction of the back panel 140 to access the vending bay 154. It is foreseen that the vending bay may be defined at least partly by additional structure (not shown) extending into an inner compartment—for example where larger mobile electronic devices are to be vended by the kiosk—without departing from the spirit of the present inventive concept. It is also foreseen that multiple vending bays may be employed in a kiosk without departing from the spirit of the present inventive concept.

The kiosk 102 also includes a transfer element 160 for transferring devices 108 from the inner compartment 148 to the vending bay 154. The transfer element 160 includes a vending elevator 162 comprising a frame 164 that defines a compartment 166. The compartment 166 opens into the vending bay 154 when the vending elevator 162 is operated and moved into dispensing alignment with the vending bay 154.

The transfer element 160 also includes a vertically-extending rail 168 along which the vending elevator 162 rides. The vending elevator 162 is configured for locking engagement with at least one drive train component (not shown) of the transfer element 160 that extends along a substantial portion of the length of the rail 168. More particularly, the drive component of the transfer element 160 is driven by an electric motor 169 along the rail 168 and, by virtue of its locked engagement with the vending elevator 162, drives the vending elevator 162 up and down during vending operations according to known principles. An exemplary drive component may consist of a portion of a drive chain—which may, for example, be an endless chain with links that engage with toothed wheels (not shown) driven by the electric motor 169—that transmits power from the motor 169 to the vending elevator 162. However, it is foreseen that other known components for generating and/or transferring power for lifting along a track or rail system may be employed without departing from the spirit of the present inventive concept.

In this manner, the vending elevator 162 moves between the vending bay 154 and layers of devices 108 stored in inner compartment 148. For instance, upon arrival of the vending elevator 162 at a desired layer of devices 108, a motor-driven spiral 111 may be engaged to dispense one of the desired devices 108, causing it to drop into the vending elevator 162. The driving electric motor 169 of the transfer element 160 may reverse the direction of rotation of its output shaft (not shown) causing the drive component—and, therefore, the vending elevator 162—to descend until aligned with the vending bay 154. A user may obtain the device 108 from the vending bay 154.

It is foreseen that a transfer element may include additional vertical rails or tracks without departing from the spirit of the present inventive concept. It is also foreseen that a variety of known devices and mechanisms may be used in addition to or in lieu of the transfer element described herein without departing from the spirit of the present inventive concept, it being understood that the choice of a particular means for achieving the internal transfer of mobile electronic devices between compartments will be within the capability of one having ordinary skill in the art following review of this description. For instance, robotic retrieval mechanism(s), rotating compartments or the like may be used in addition to or in lieu of the vending elevator(s) without departing from the spirit of the present inventive concept. Still further, it is foreseen that one or more of the motor-driven structures described above for internal mobile electronic device transfer may be configured to move mobile electronic devices between any combination of the vending bay, a reverse-vending bay, storage bays, the inner compartment and other compartments within the kiosk (such as, for example, a dedicated diagnostics bay) without departing from the spirit of the present inventive concept. It is also foreseen that a single bay may serve as both a vending bay and a reverse-vending bay without departing from the spirit of the present inventive concept.

The transfer element 160 may also include an electrical connector 170 comprising a data cable and a terminal including a plug 171 configured to mate with the data port(s) of at least one type of mobile electronic device 108. The electrical connector 170 preferably also includes a power cable for providing power to the mobile electronic device(s) 108 to which it connects. It is foreseen that multiple electrical connectors may be provided for wired data transfer with a variety of device types without departing from the spirit of the present inventive concept. The terminal plug 171 of the connector 170 is positioned within the vending elevator 162 to permit manual insertion into a data port of a mobile electronic device 108. Manual insertion may occur after the user has unwrapped the dispensed mobile electronic device following vending in embodiments where the electronic device 108 is packaged, for example where the kiosk 102 instructs the user to re-insert the device 108 for configuration operations, if desired. It is foreseen that automated insertion may be employed without departing from the spirit of the present invention.

The connection provided by the electrical connector 170 may be used for performing diagnostic processes, data transfer, configuration, resetting software and memory devices to factory condition, and other processes described elsewhere herein. Preferably, however, devices 108 are new and may require only a subset of these processes, or none at all. It is foreseen that a plurality of electrical connectors may be positioned along the racks or bays in the inner compartment, such that an electrical connection may be established with individual mobile electronic devices to carry out one or more of the processes described herein prior to movement toward the vending bay, in certain embodiments without departing from the spirit of the present inventive concept. It is also foreseen that no connector for newly-vended devices may be provided without departing from the spirit of the present inventive concept.

The electrical connector 170 preferably also or alternatively includes one or more data cables and power cables for providing power and operational signals from the computing device 110 to the motor 169. It is foreseen that control of the motor 169 may alternatively or additionally be achieved by providing a wireless receiver (not shown) in communication with the motor 169 for receiving instructions wirelessly from the computing device 110.

The kiosk 102 also includes a plurality of storage bays 172 configured for receiving pre-owned user mobile electronic devices 106 for at least temporary storage as described herein. The bays 172 may comprise compartments substantially defined by casings (not shown) embedded in right-side panel 144 and arranged in columns and rows. (See FIG. 5) The bays 172 may include doors 174 for selective unlocking as instructed by the kiosk software application, for example when a user has requested a diagnostic of his device 106 and the kiosk software application has assigned one of the bays 172 to the user. The unlocked door 174 may be manual or self-opening—for instance, it may be spring-loaded or may be driven my electric motor—without departing from the spirit of the present inventive concept. It is foreseen that the storage bays 172 may be defined at least partly by additional structure (not shown) extending into inner compartment 148—for example where larger mobile electronic devices 106 are to be received at kiosk 102—without departing from the spirit of the present inventive concept.

The kiosk 102 also includes a diagnostics element 176 for assessing the status of mobile electronic devices 106. The diagnostics element 176 includes a diagnostics elevator 178 comprising a frame 180 that defines a compartment 182. The compartment 182 opens into one or more assigned bays 172 when the diagnostics elevator 178 is operated and moved into alignment with any such bay 172, for example where the computing device 110 has received a trade-in and/or diagnostics request and has assigned a bay 172 to the originating user through which to perform an assessment of the subject device 106.

The diagnostics element 176 also includes a vertically-extending rail 184 along which the diagnostics elevator 178 rides. The diagnostics elevator 178 is configured for locking engagement with at least one drive train component (not shown) of the diagnostics element 176 that extends along a substantial portion of the length of the rail 184. More particularly, the drive component of the diagnostics element 176 is driven by an electric motor 185 along the rail 184 and, by virtue of its locked engagement with the diagnostics elevator 178, drives the diagnostics elevator 178 up and down during vending operations according to known principles. An exemplary drive component may consist of a portion of a drive chain—which may, for example, be an endless chain with links that engage with toothed wheels (not shown) driven by the electric motor 185—that transmits power from the motor 185 to the diagnostics elevator 178. However, it is foreseen that other known components for generating and/or transferring power for lifting along a track or rail system may be employed without departing from the spirit of the present inventive concept.

Figure 8:
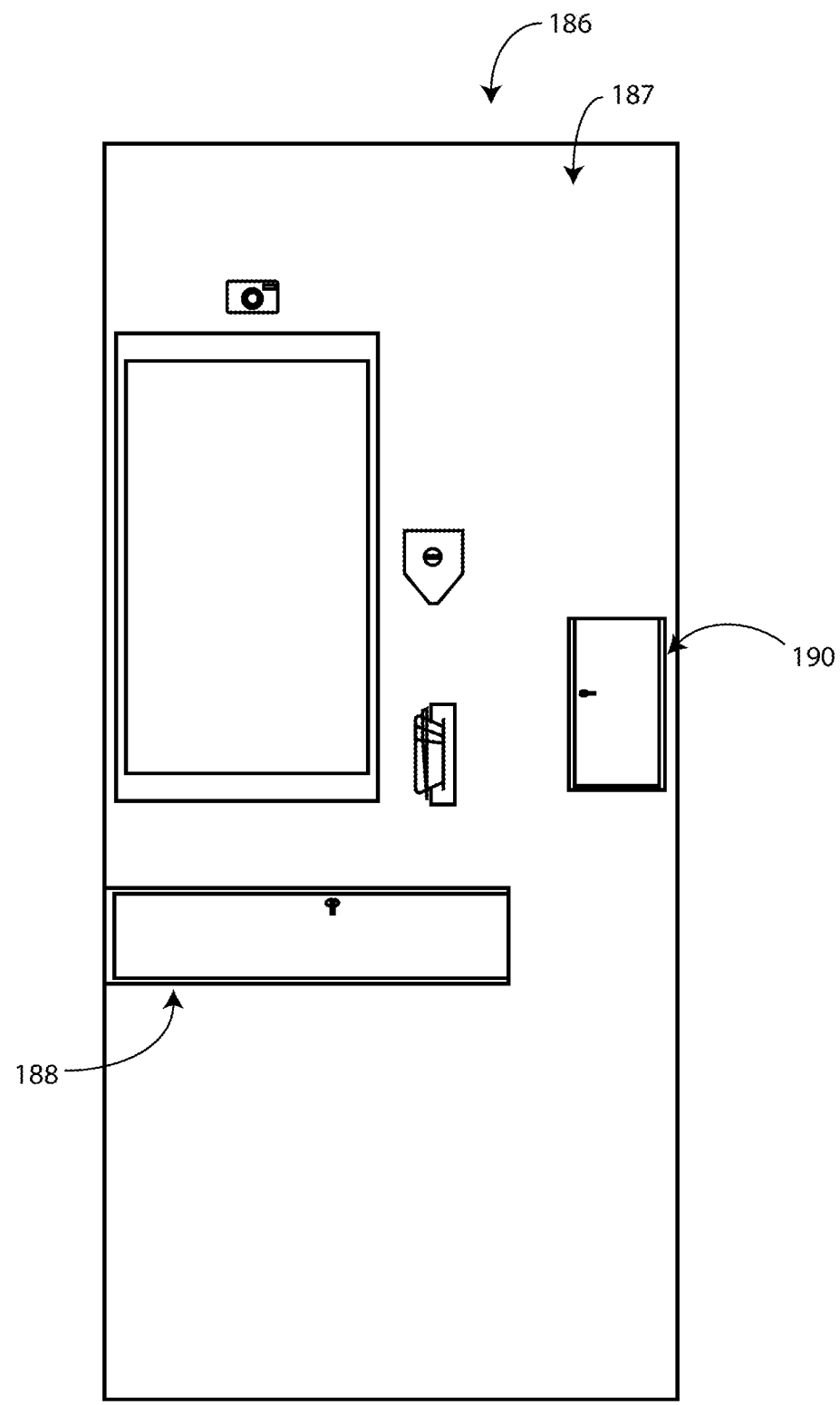
FIG. 8 is a front view of a kiosk according to an embodiment of the present inventive concept having a single storage bay door.
Figure 9:
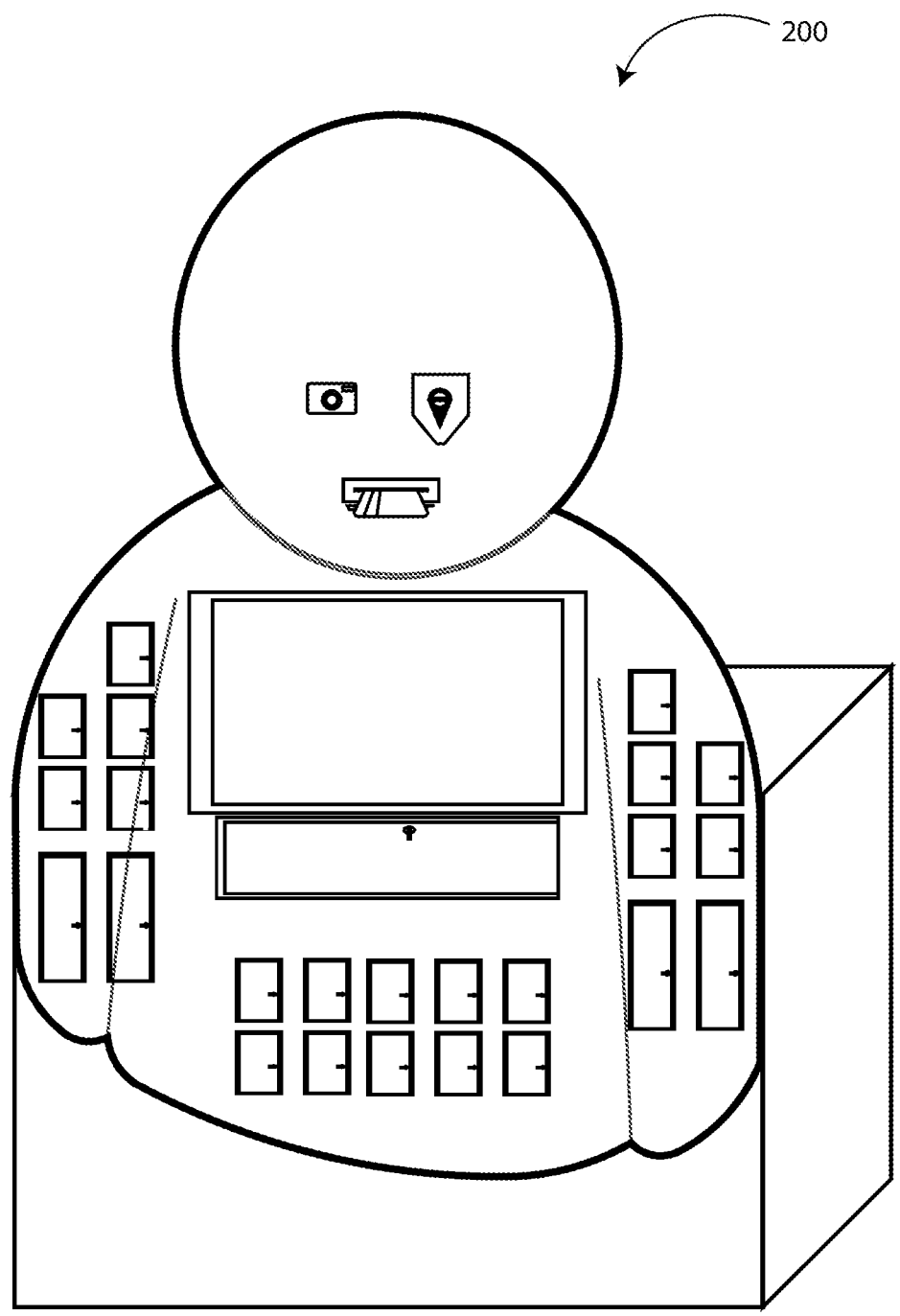
FIG. 9 is a front perspective view of a kiosk according to an embodiment of the present inventive concept configured to resemble an android form.
Figure 10:
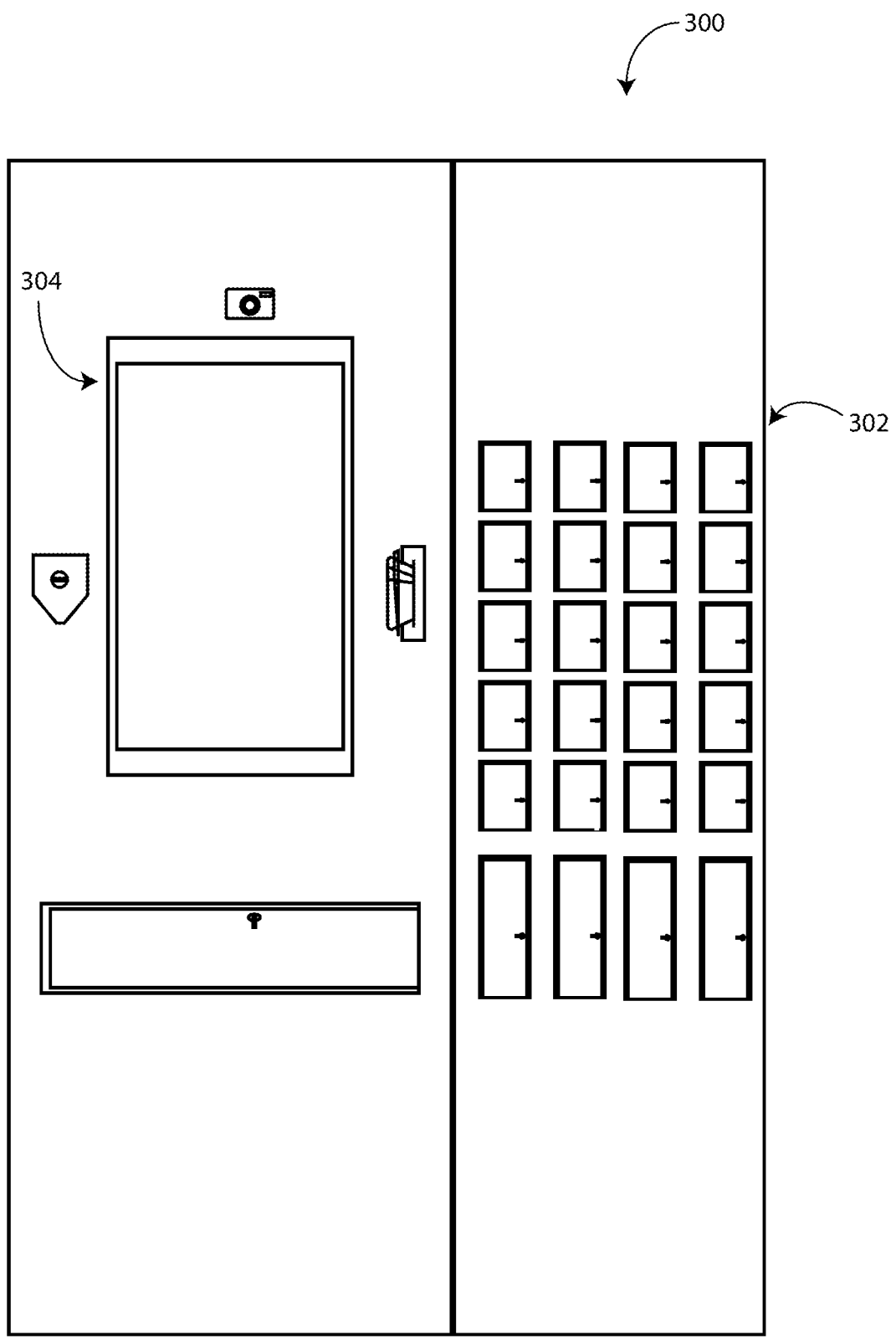
FIG. 10 is a front perspective view of a kiosk according to an embodiment of the present inventive concept with user-facing components arranged for accessibility by seated users.
Figure 11:
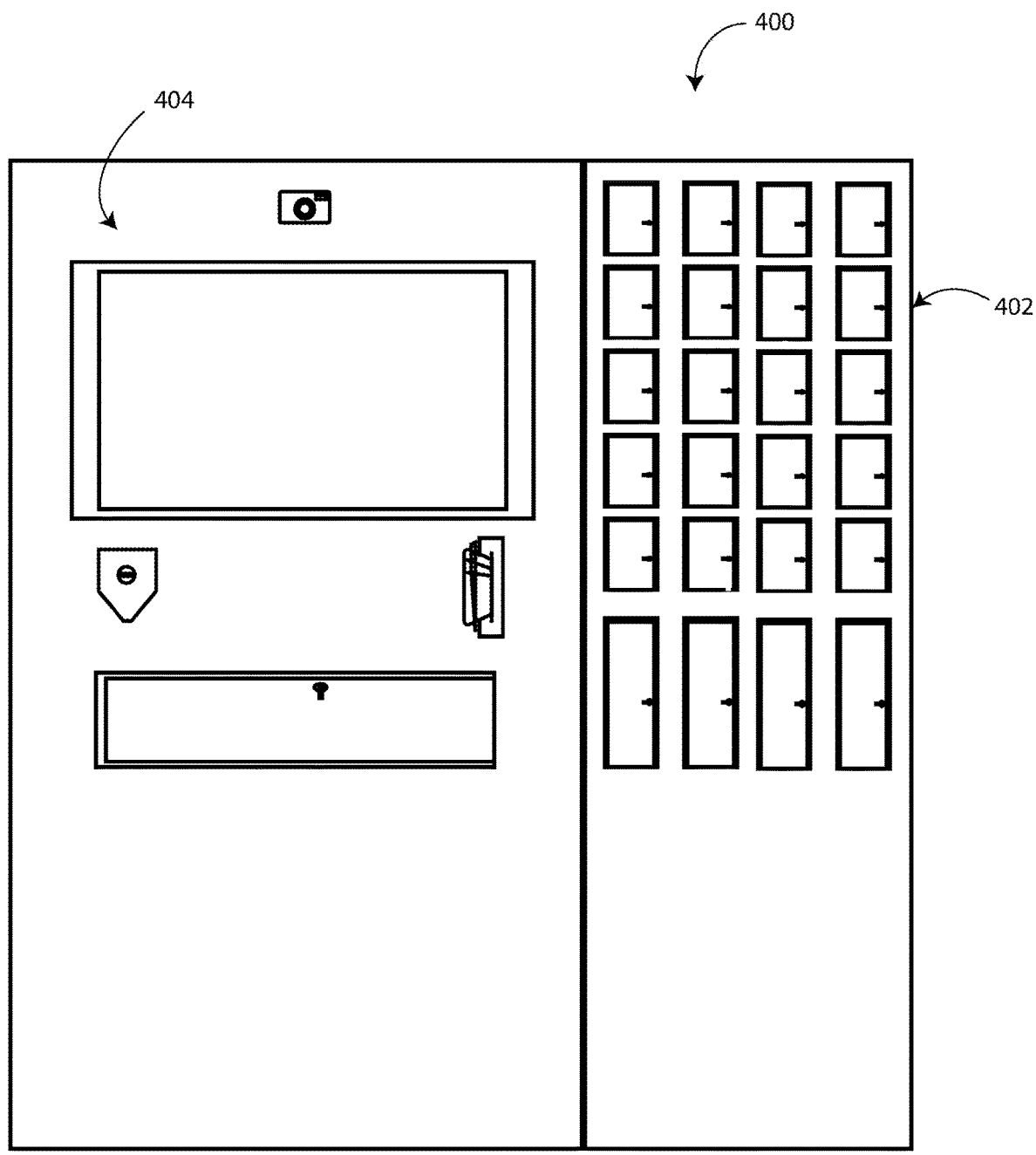
FIG. 11 is a front perspective view of a kiosk according to an embodiment of the present inventive concept with user-facing components arranged for accessibility by seated users.
Figure 12:
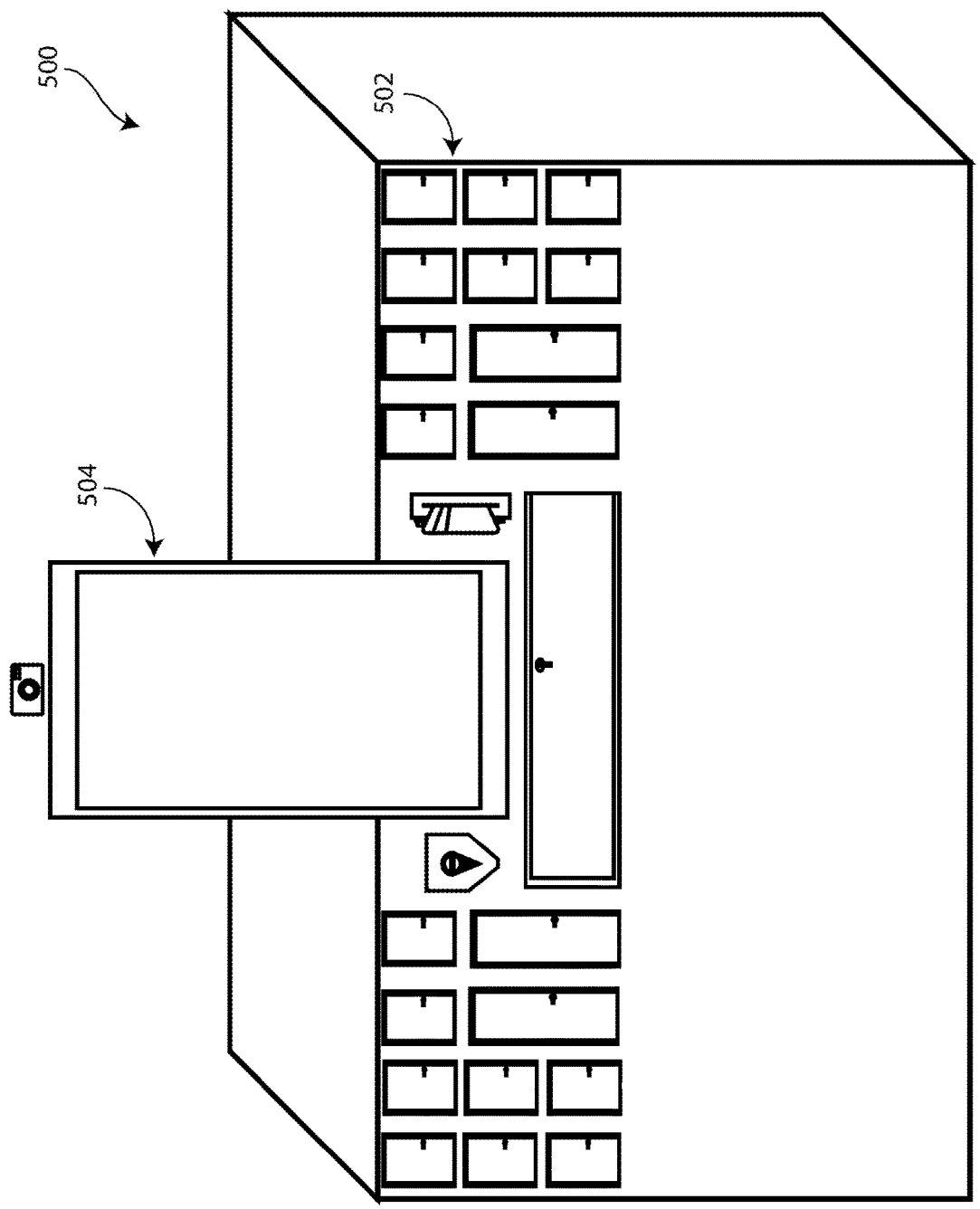
FIG. 12 is a front perspective view of a kiosk according to an embodiment of the present inventive concept with user-facing components arranged for accessibility by seated users.
Figure 13:
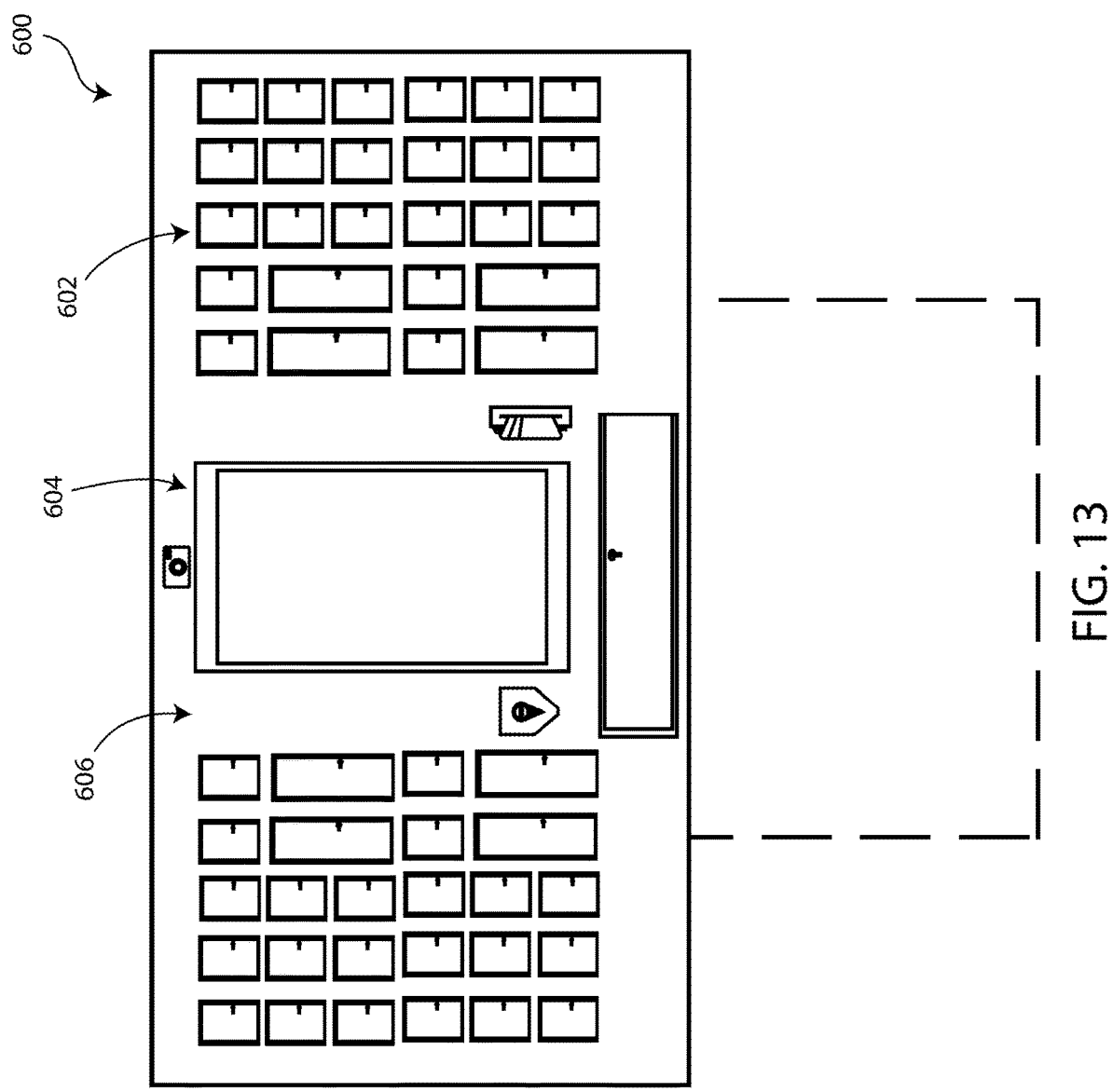
FIG. 13 is a front perspective view of a kiosk according to an embodiment of the present inventive concept configured for wall mounting.
Figure 14:
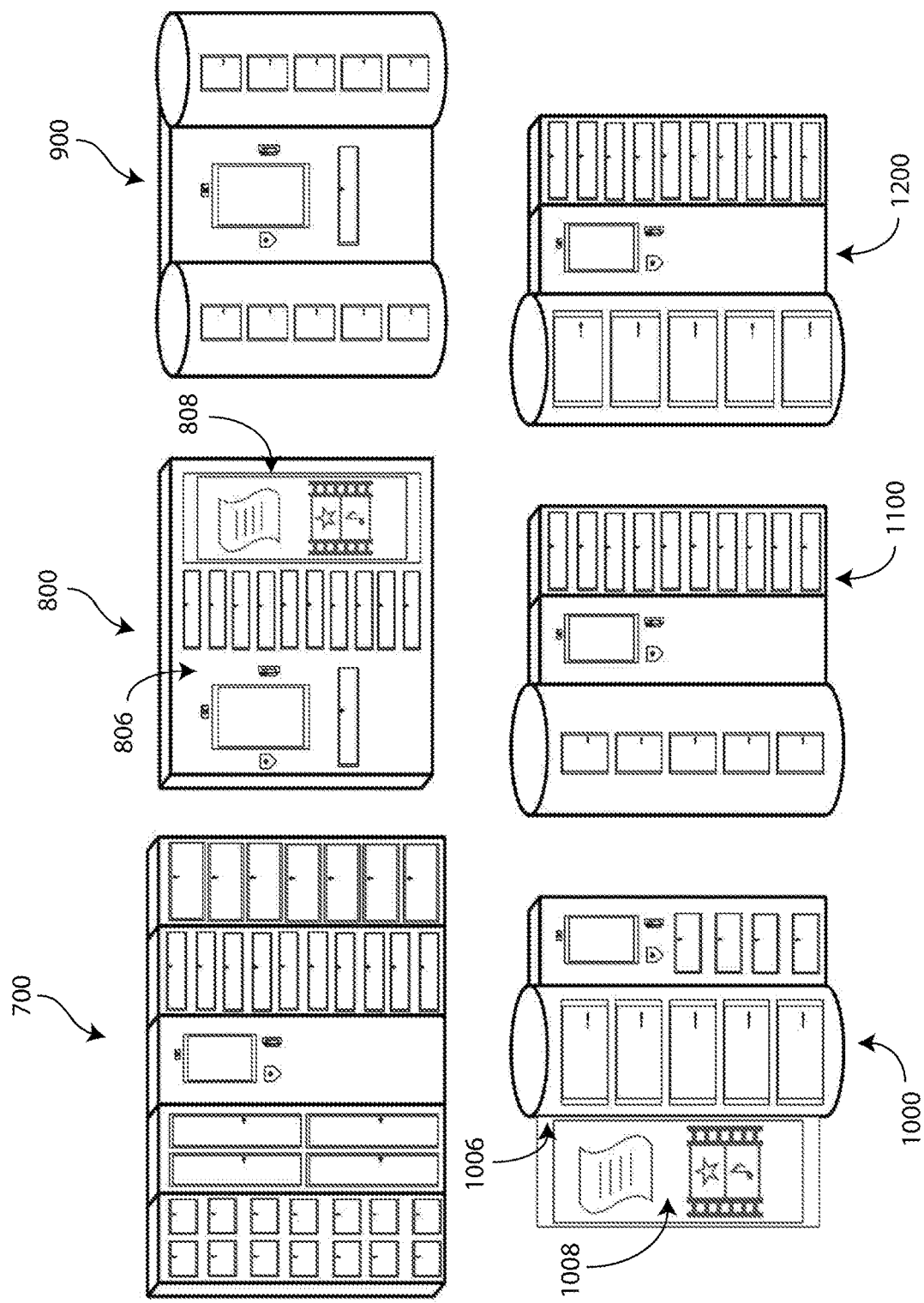
FIG. 14 illustrates six different kiosks according to various embodiments of the present inventive concept from elevated perspective views.
Figure 15:
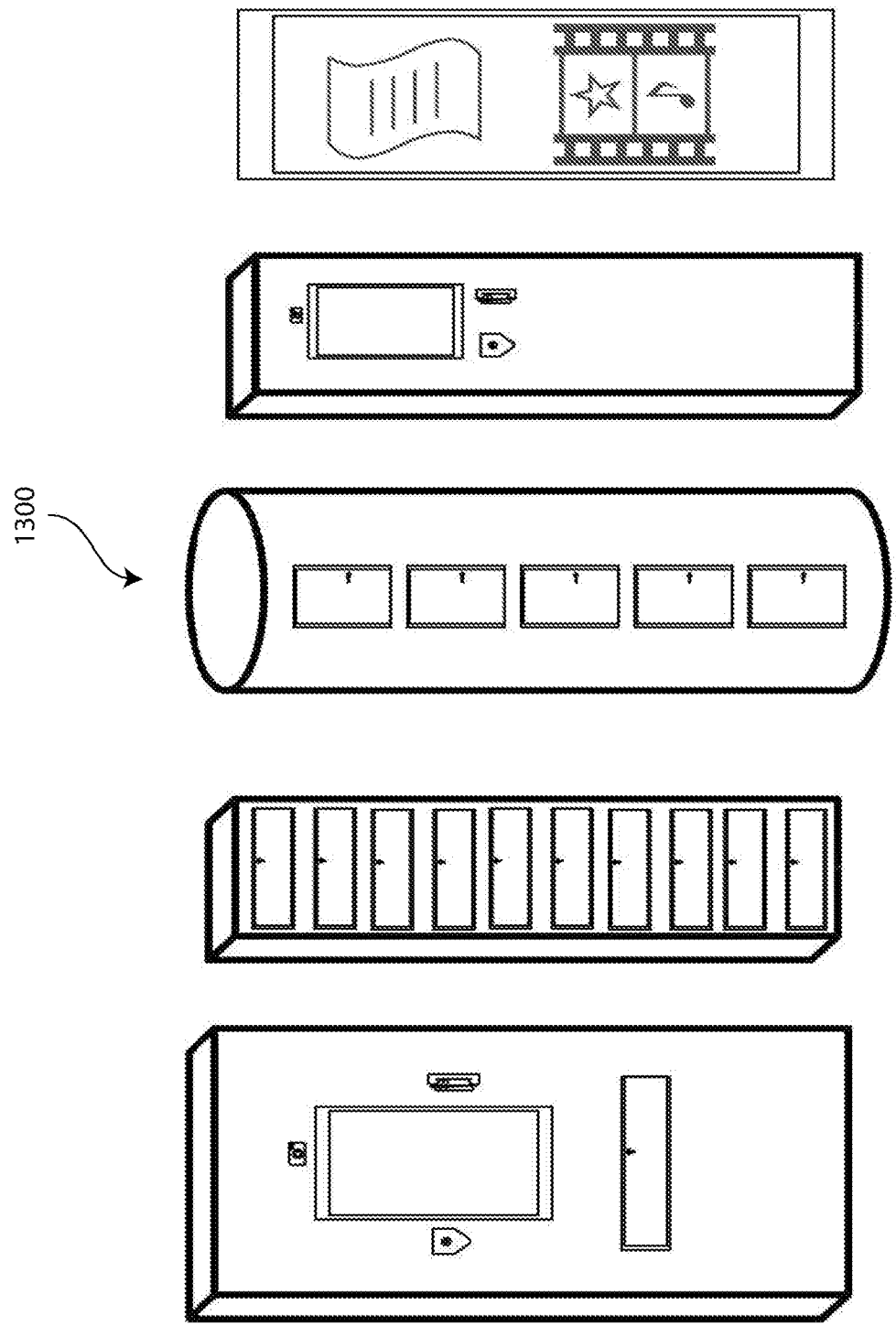
FIG. 15 illustrates various modular components comprising a kiosk according to an embodiment of the present inventive concept from an elevated perspective view.

It is foreseen that, in some embodiments, a diagnostics elevator may alternatively or additionally travel to the vending bay or another bay used as a common point of deposit and/or pick up for all trade-in and/or other mobile electronic devices; in such embodiments, the storage bays may not be opened to users to facilitate transactions, it being understood that exchange of such devices may instead occur via the common device bay. For example, a kiosk 186 illustrated in FIG. 8 includes a front panel 187. The kiosk 186 also includes a vending bay 188 for vending of new mobile electronic devices. The kiosk 186 also includes a common reverse-vending bay 190 for receiving trade-in mobile electronic devices. Devices for trade in may be stored in one or more storage bays, though in this embodiment the storage bays (not shown) are internal and not accessible to users at the front panel 187. Instead, an internal diagnostics elevator (not shown) may physically transfer trade-in devices to and from the reverse-vending bay 190 and the internal storage bays. In such embodiments, conveyors, spirals or other electric motor-driven devices may be employed to complete internal movements of mobile electronic devices between elevators and bays.

Returning to the illustrated embodiment, during operation the diagnostics elevator 178 may arrive at a desired storage bay 172. A user may insert the subject mobile electronic device 106 into the bay 172 and/or elevator 178 for performance of an assessment, as described in more detail below. Upon completion of the assessment, the device 106 may—particularly if a trade-in transaction is not to be completed—be made available again via a door 174 of the bay 172 in which it was assessed.

It is foreseen that the diagnostics element may include additional vertical rails or tracks without departing from the spirit of the present inventive concept. It is also foreseen that a variety of known devices and mechanisms may be used in addition to or in lieu of the diagnostics element described herein without departing from the spirit of the present inventive concept, it being understood that the choice of a particular means for achieving the internal transfer of mobile electronic devices between storage bays will be within the capability of one having ordinary skill in the art following review of this description. For instance, robotic retrieval mechanism(s), rotating compartments or the like may be used in addition to or in lieu of the diagnostics elevator(s) without departing from the spirit of the present inventive concept. Still further, it is foreseen that one or more of the motor-driven structures described above for internal mobile electronic device transfer may be configured to move mobile electronic devices between any combination of the vending bay, a reverse-vending bay, storage bays, the inner compartment and other compartments within the kiosk (such as, for example, a dedicated diagnostics bay) without departing from the spirit of the present inventive concept. It is also foreseen that, as introduced above, a single bay may serve as both a vending bay and a reverse-vending bay without departing from the spirit of the present inventive concept.

The diagnostics element 176 also includes a diagnostic cable wire harness 192 comprising a data cable and a terminal including a plug 193 configured to mate with the data port(s) of at least one type of mobile electronic device 106. The diagnostic cable wire harness 192 preferably also includes a power cable for providing power to the mobile electronic device(s) 106 to which it connects. It is foreseen that multiple electrical connectors may be provided for wired data transfer with a variety of device types without departing from the spirit of the present inventive concept. The terminal plug 193 of the wire harness 192 is positioned within the diagnostics elevator 178 to permit manual insertion into a data port of a mobile electronic device 106. It is foreseen that automated insertion may be employed without departing from the spirit of the present invention. The connection may be used for performing diagnostic processes, data transfer, configuration, resetting software and memory devices to factory condition, and other processes described elsewhere herein.

It is foreseen that a plurality of electrical connectors may be positioned in some or all of the storage bays, such that an electrical connection may be established to carry out one or more of the data transfer processes without the need for moving a common wire harness between the various storage bays, in certain embodiments without departing from the spirit of the present inventive concept. It is also foreseen that two or more groups of a plurality of storage bays may be configured specifically to receive particular mobile electronic devices without departing from the spirit of the present inventive concept. More particularly, a first group of storage bays may be configured to receive mobile electronic devices having a data port of a first type and configuration (i.e., standard), and each storage bay of the first group may include a corresponding electrical connector. Likewise, a second group of storage bays may be configured to receive mobile electronic devices having a data port of a second type and configuration, and each storage bay of the second group may include a corresponding electrical connector. It is foreseen that additional groups of storage bays may be similarly configured and, further, that the mobile electronic devices stored in the inner compartment for vending may be similarly organized—including with specialized electrical connectors being associated with individual groups—without departing from the spirit of the present inventive concept. It is also foreseen that the wire harness 192 may carry multiple plugs in addition to the terminal plug 193, the various plugs preferably being constructed according to at least two different computer bus standards (e.g., USB connectors and connectors sold in connection with the trademark Lightning®).

The diagnostic cable wire harness 192 preferably also or alternatively includes one or more data cables and power cables for providing power and operational signals to the motor 185 that drives the diagnostics elevator 178. It is foreseen that control of the motor 185 may alternatively or additionally be achieved by providing a wireless receiver in communication with the motor 185 for receiving instructions wirelessly from the computing device 110. It is similarly foreseen that data transfer and communication between the computing device 110 and one or more of the device(s) 106, 108—for example to perform diagnostic processes, data transfer, configuration, resetting software and memory devices to factory condition, and other processes described elsewhere herein—may be established via wireless links, in addition to or in lieu of the wired connection(s) provided by electrical connector 170 and wire harness 192, without departing from the spirit of the present inventive concept.

The kiosk 102 may also include a camera 194 (see FIG. 4) positioned along the front panel 142. The camera 194 may be used for closed-loop monitoring and/or data collection relating to events occurring around the kiosk 102, for identifying users, and/or for visually identifying one or more characteristics of the mobile electronic devices 106 users seek to trade in. The kiosk 102 may also include a card reader 196 for receiving and processing data regarding a user, a user device 106, and/or a financial/authentication card, for example to assist in user identification/authentication and/or payment processes. The kiosk 102 may also include a scanner 198 for interrogating a visually perceptible identification code (e.g., a bar code, QR-code, numerical code, etc.) to identify a mobile electronic device 106, a user, a user identification document, a user account, a user payment account/method, or the like. Each of the diagnostics element 176, transfer element 160, camera 194, card reader 196 and scanner 198 is connected via a wire connection 199, for example comprising a data cable, to the computing device 110 for electrical communication therewith.

It is foreseen that other scanners may be employed, such as RFID transmitters/receivers/transceivers, in certain applications without departing from the spirit of the present inventive concept. Further, it is foreseen that the relative position, configuration, numerosity, and/or specific mode of operation of the sensor and computer input components of the kiosk described herein may be altered without departing from the spirit of the present inventive concept. Still further, it is foreseen that additional security devices and/or means of identification may be used with a kiosk without departing from the spirit of the present inventive concept. For instance, biometric or geofenced applications and/or hardware may be incorporated into the user/device identification, validation and/or authentication processes described herein. ADDITIONAL EMBODIMENTS OF THE KIOSK Turning briefly now to the embodiments of FIGS. 8-15, it is initially noted that each of the kiosks 186, 200, 300, 400, 500, 600, 700, 800, 900, 1000, 1100, 1200, 1300 is similar in some respects to the kiosk 102 describe above. Therefore, for the sake of brevity, only certain of the components unique to each additional embodiment will be described here, with a complete disclosure of the similar components being readily understood by one of ordinary skill in the art upon a review of the disclosure above.

Kiosk 186, as described above, includes common reverse-vending bay 190 for receiving mobile electronic device(s) 106. (See FIG. 8)

The various components of kiosk 200 are arranged for aesthetic purposes to resemble an android or the like. (See FIG. 9)

The various components of kiosks 300, 400, 500 (FIGS. 10-12) are arranged to be particularly accessible to disabled individuals, including because pluralities of storage bays 302, 402, 502 are condensed vertically and spread across a greater horizontal span (as compared to the kiosk 102) to increase the chances that the bays 302, 402, 502 will be within reach of an individual sitting in a wheelchair. Likewise, user interfaces 304, 404, 504 and other peripheral sensors and input devices are positioned nearer to the reach of wheelchair-bound individuals to facilitate easier access.

The various components of kiosk 600 (FIG. 13)—including storage bays 602 and a user interface 604—occupy a greater proportion of the total space available along a front panel 606. The components are also condensed vertically and spread across a greater horizontal span (as compared to the kiosk 102). The kiosk 600 exemplifies arrangements that may be wall mounted. It is foreseen that such a wall mounted kiosk may draw from new mobile electronic device inventory (not shown) that is stored within a wall on which the kiosk is mounted. Similarly, it is foreseen that such a wall mounted kiosk may deposit pre-owned mobile electronic devices in storage bays or the like that are also within the wall on which the kiosk is mounted.

Kiosks 700, 800, 900, 1000, 1100, 1200 (FIG. 14) exemplify various additional layouts of components discussed above. Of particular note, kiosks 800 and 1000 include secondary video devices 808, 1008. The secondary video devices 808, 1008 are preferably embedded respectively within and/or positioned along front panels 806, 1006. The secondary video devices 808, 1008 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The secondary video devices 808, 1008 may also include data input components such as a keyboard, a mouse, or other peripheral components and communication components that provide wired or wireless communication. The secondary video devices 808, 1008 may possess a square or a rectangular aspect ratio and may be viewed in either a landscape or a portrait mode. Preferably, each of the secondary video devices 808, 1008 includes a touchscreen. In various embodiments, each of the secondary video devices 808, 1008 may include a touch screen occupying the entire screen or a portion thereof. In each case, the touch screen may allow the user to interact with the secondary video device 808 or 1008 by physically touching, swiping, or gesturing on areas of the screen.

The secondary video devices 808, 1008 are preferably activated to display information while a user is transacting at the kiosks 800, 1000. More particularly, the secondary video devices 808, 1008 may—under the instructions of the computing device 110 and/or remotely-issued instructions (such as those that might be issued by an ad server or the like)—display a variety of different content. For instance, the secondary video devices 808, 1008 may display instructional content to help guide the movements or selections that a user may be required to make. Such content is preferably displayed on the secondary video devices 808, 1008 to de-clutter user interfaces 804, 1004 during such transactions and/or to provide visually distinct, unrelated material for optional engagement by the user. Such unrelated material may include advertisements for third party services and/or goods. In addition, the secondary video devices 808, 1008 may be activated to display additional offerings that are related to users' transactions, for example advertisements for add-on services offered by telecommunications carriers for mobile electronic devices being offered for purchase. It is foreseen that additional types of information may be displayed at and/or of user engagement may be solicited or received at the secondary video devices 808, 1008 without departing from the spirit of the present inventive concept. It is also foreseen that the computing device 110 may tailor the information displayed at the secondary video devices 808, 1008 according to information retrieved or input relating to each individual user to enhance the user experience.

Turning briefly to more general discussion, a kiosk according to embodiments of the present inventive concept may be designed in a modular, extensible manner in which broad functions of the kiosk may be implemented in components that may be removed, added, extended, or duplicated to produce unique implementations to suit specific circumstances. For example, a kiosk may consist of a payment terminal, one or more collections of lockers, one or more conveyor, elevator, or robotic forward vending solutions, and one or more carousels of products, in any combination; for further example, in a preferred embodiment, a kiosk may consist of a monolithic implementation incorporating payment and related activities, forward vending of purchases, and reverse-vending of trades. Further, any of the foregoing types of kiosks might be extended with additional elements as described, in any combination, and in any quantity as appropriate to the implementation. Further still, these implementations may be presented in various styles and configurations for purposes of branding, the improvement of accessibility, or to meet other requirements dependent in part or wholly upon aesthetic, functional, or spatial attributes.

For instance, kiosk 1300 (FIG. 15) is a modular embodiment in which various components described above are housed in different housings or casings. Nevertheless, the kiosk 1300 may be, and preferably is, operated using a common and coordinated central kiosk computer in electrical and/or wireless communication with each modular unit that comprises the kiosk 1300. It should be noted that a wireless receiver is preferably included, and/or cable/wire connections are preferably received, at each modular unit to provide for communication with and coordination by the central kiosk computer. It should also be noted that the modular units are preferably placed in proximity to one another (e.g., within about twenty feet (20 ft.)) for user convenience.

Exemplary Computer-Implemented Method

Figure 16:
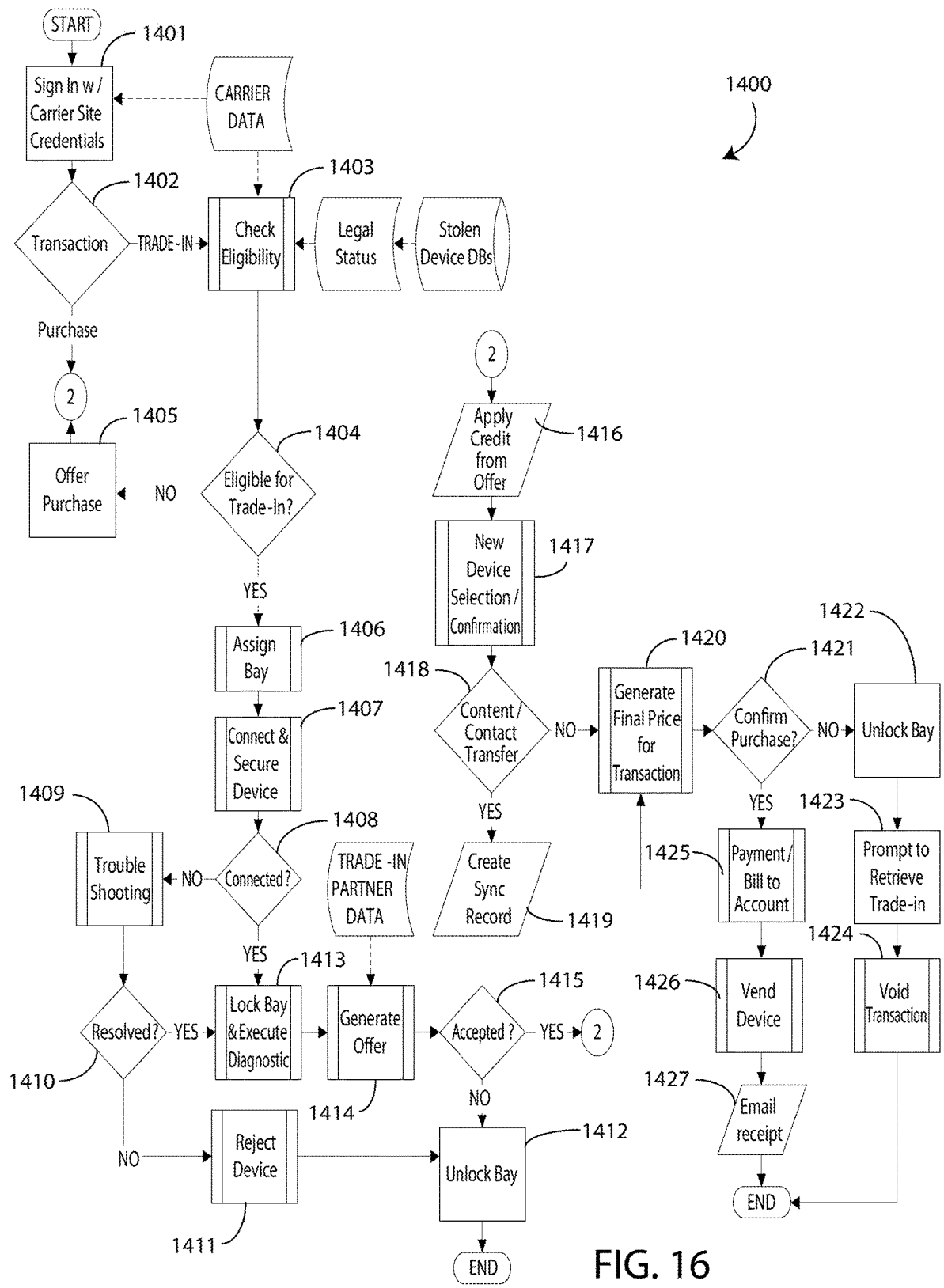
FIG. 16 illustrates the steps of an exemplary method for conducting a combined transaction via a kiosk according to an embodiment of the present inventive concept.

FIG. 16 depicts a listing of steps of an exemplary computer-implemented method 1400 for vending and reverse-vending mobile electronic devices 106, 108. The steps may be performed in the order shown in FIG. 16, or they may be performed in a different order. Furthermore, some steps may be performed concurrently as opposed to sequentially. In addition, some steps may be optional. The steps of the computer-implemented method 1400 may be performed by the computing device 110. In a preferred embodiment, a computer-readable medium of the memory element 114 is provided for vending and reverse-vending mobile electronic devices 106, 108. The computer-readable medium may include the kiosk software application stored thereon, wherein the kiosk software application instructs the processing element 112 of the computing device 110 to perform the steps described herein. The computing device 110 may perform certain of the steps described herein through communication links 122 of the communication network 120.

The method may include, and the computer-readable medium may instruct the processing element 112 to perform, additional, fewer, or alternative actions, including those discussed elsewhere herein. For example, the kiosk software application may instruct the processing element 112 to issue operational instructions to at least some of the motors that drive moving components of the kiosk 102 to achieve actions described or fairly implied herein. For another example, the kiosk software application may direct or manage the execution of instructions received from third party systems, such as instructions received from carrier servers 116, 118 of telecommunications carriers that may relate to: recordation of the sale/purchase of a device 106, 108 by a user; configuration, setup, data transfer and/or restoration of such a device 106, 108; pricing for the sale/purchase of such a device 106, 108, or other such operations and data transfers that may correspond to the transactions and/or steps described herein.

Returning to the method of FIG. 16, it is broadly noted that input from and selections of the user described herein may be solicited and/or provided at or via one or more of the user interface 104 and a wireless or wired link between the kiosk 102 and the user mobile electronic device 106 and/or another user device. It is foreseen that other user input/output devices may be provided and/or that input may be accepted from same without departing from the spirit of the present inventive concept. Data exchange between the kiosk 102 and one or both of user mobile electronic devices 106, 108 may be established via wireless or wired connection. It is envisioned that a user may exit his user/transaction session at any time via submission of corresponding input to the kiosk 102. The user may also be involuntarily exited from his user session if all options for services/transactions are exhausted/completed. After exiting a user session, the user is preferably prompted to repeat the sign in process described below if further input is received from the user.

Turning more particularly to step 1401, the method 1400 may include completing a sign-in process to identify the user. The sign-in process at step 1401 may additionally or alternatively be directed to confirming authorization of the user to access information regarding and/or to make changes to a user account. The user account may be maintained by computing device 110 of the kiosk 102, by a remote server dedicated at least in part to operation of the kiosk 102, and/or be accessible within a third party database such as one maintained at a carrier server 116, 118 by a telecommunications carrier. The sign-in process 1401 may require entry of at least one unique combination of alphanumeric and other characters—such as a username or e-mail address and, preferably, a password. The kiosk 102 may accept the user's entered values by confirming their authenticity via computing device 110 and/or at least one of carrier servers 116, 118. It is foreseen that the sign-in process 1401 may include or consist of sensing and/or receiving data regarding aspects of the user and/or a device 106 of the user to determine identity and/or authorization. For example, the kiosk 102 may complete all or part of the sign-in step 1401 by collecting biometric data via the camera 194 of the kiosk 102 and/or by utilizing near field communication to identify the device 106. It is also foreseen that certain of the services offered by the kiosk 102 may not require a sign-in process.

Once the sign-in step 1401 is complete, any resulting authorization to access and/or change user account information, settings and/or agreement/subscription status may persist throughout the user session, i.e., until the user completes all requested transactions and/or chooses to end the user session prematurely. It is foreseen that a delay of predetermined duration by the user in making a selection or input may, however, trigger a requirement to sign-in again before proceeding with one or more transaction(s) at the kiosk 102 without departing from the spirit of the present inventive concept.

Referring to step 1402, the user may be prompted or offered the opportunity to input the type of desired transaction(s) and/or service(s) to be facilitated by the kiosk 102. Preferably, the user is required to choose whether or not he desires to trade in a device 106 before proceeding with a purchase transaction. It is foreseen, however, that the purchase-related steps described herein may precede the trade-in related steps without departing from the spirit of the present inventive concept. Moreover, in a preferred embodiment, the kiosk 102 will offer transactions beyond vending and reverse-vending devices 108, 106. For example, the kiosk 102 may permit the user to adjust, add and/or remove various carrier transactions and services, including but not limited to account maintenance, bill payment, service and subscription selection, establishing new lines of service, authorizing and de-authorizing users of features and services, and transferal of ownership or authority.

If the user selects a trade-in transaction, eligibility for a trade-in transaction may be checked 1403 by or via the computing device 110. Eligibility data may be used to check 1403 eligibility for a trade in. The eligibility data may be stored locally at computing device 110 and/or remotely, for example at at least one of the carrier servers 116, 118. The eligibility data may relate to the legal ownership status of the device 106 the user proposes to trade in. The legal ownership status eligibility data may include, for example, data obtained from a stolen device database. The legal ownership status eligibility data may also include data regarding whether the device 106 is currently leased or was previously purchased outright by the user. It is foreseen that the specific criteria and rules governing the determination of eligibility 1403 for a trade in may vary situationally and in view of the risk tolerance of a particular kiosk operator, may be predetermined and included as part of the kiosk software application and/or may be imposed on the proposed transaction by a telecommunications carrier that provides services to the user, all without departing from the spirit of the present inventive concept.

In a simple embodiment, the eligibility check 1403 may be completed by the computing device 110 by interrogation of at least one of the carrier servers 116, 118. The computing device 110 may confirm—for example by obtaining and querying a serial number, mobile identification number or mobile subscription identification number associated with the device 106—that the user identified through the sign-in step 1401 is the unencumbered owner of the device 106 (and is not, for example, a lessee). The computing device 110 may also query the stolen device database to ensure the device identification number and/or identified user are not represented in the database. The computing device 110 may also determine whether a services contract—for example one to which the user and a telecommunications carrier are parties—specifies a minimum time period before and/or a date on which the user's device 106 may be upgraded to a device 108. If the minimum time period has passed and/or the date has been reached, such a criterion may be satisfied.

If the criteria comprising the eligibility check 1403 have been satisfied, the computing device 110 may render 1404 a determination regarding whether the device 106 presented by the user is eligible for a trade in. The result may simply be registered in the computing device 110, but may also be the subject of a notification displayed or transmitted for display to the user.

If the determination 1404 is negative, the user may be prompted or offered 1405 the opportunity to purchase a device 108 from the kiosk 102. The user may select a purchase transaction. The details of a purchase transaction are discussed in later sections below.

If the determination 1404 is positive, a storage bay 172 of the kiosk 102 may be at least temporarily assigned 1406 to the user device 106 by the processing element 112. The processing element 112 may additionally instruct that the assigned bay 172 be unlocked for insertion of the device 106 and that the diagnostics elevator 178 be moved into alignment with the assigned bay 172. It should be noted, however, that assignment of a storage bay 172 may be delayed until after a completed trade-in transaction becomes imminent—for example where a wireless connection is used to complete the diagnostics steps outlined herein—without departing from the spirit of the present inventive concept.

If communication between the device 106 and the kiosk 102 has not yet been established sufficiently for the performance of a diagnostics check (see step 1412 described below), the kiosk 102 may attempt to establish 1407 such a connection. Establishing 1407 a connection may include establishing electrical communication between the diagnostic cable wire harness 168 and the device 106. In such embodiments, the user is preferably instructed or invited to place the device 106 into the assigned storage bay 172 and/or diagnostics elevator 178. The computing device 110 may cause display of instructions for doing so at the user interface 104, for example in the form of animations or the like showing insertion of a device into a storage bay and mating a diagnostic cable wire harness to a data port of the device. For another example, the computing device 110 pay cause display of instructions—which are preferably customized to the device type—for establishing a wireless connection between the communication element 115 and the device 106 using a user interface of the device 106.

The computing device 110 may render 1408 a determination regarding whether the data connection was properly established 1407. In embodiments where a wired connection is sought, the determination 1408 may include determining whether the diagnostic cable wire harness 168 is fully and properly seated in the data port of the device 106, for example by determining whether all data transfer prongs or other electrical contacts at the interface are transferring signals and/or current appropriately. The determination 1408 may also include a software and memory access inquiry in which the computing device 110 confirms that sufficient access to device 106 utilities and memory has been made available to successfully perform the required diagnostic(s).

In such embodiments, the determination 1408 may also include sensing whether the door 174 of the assigned storage bay 172 is closed. The open or closed status of the door 174 may be sensed, for example, using simple electrical or magnetic elements (not shown) that are mounted in pairs. One element of each pair may be mounted to the door 174 and the other may be mounted to a frame or fixed latch of each of the storage bays 172. In this manner, proximity of the elements of each pair and/or completion of an electrical circuit therebetween may produce and/or enable a signal indicating closure has occurred. At least one element of each such pair of closure sensing elements is preferably in electrical communication with the communication element 115 of the computing device 110 for transfer of the signal indicating closure. In a simple embodiment, a pair of closure elements may comprise two metal strips. In another embodiment, a pair of closure elements may comprise a pair of magnets and/or a magnet and a strip or block of ferromagnetic metal.

If the determination 1408 is negative—indicating sufficient communication has not been established 1407, that the device 106 is not properly mated to the diagnostic cable wire harness 168, and/or that the door 174 is not closed—the computing device 110 may execute 1409 a troubleshooting application. The troubleshooting application may instruct more detailed analysis of the deficiencies leading to the negative determination 1408, which may include targeted interrogation of the connection with and/or state of the device 106 using electrical signals and/or data collection. The troubleshooting application may also issue instructions to the user—which may include animated instructions illustrating how the user might move—and/or request input from the user for information that might be relevant in further narrowing the potential cause of the deficiency(ies). It is foreseen that a person of ordinary skill will be capable, upon review of this disclosure, of preparing an appropriate troubleshooting application for resolving deficiencies that may occur based on particular implementations of the present inventive concept.

Cyclically or at the conclusion of the troubleshooting process, the computer may render 1410 a determination as to whether the deficiencies have been resolved. The result may simply be registered in the computing device 110, but may also be the subject of a notification displayed or transmitted to the user.

If the determination 1410 is negative—indicating that the troubleshooting application has exhausted the routines available for addressing the deficiency(ies) that were identified and/or that the deficiency(ies) could not be properly identified—a rejection process may be triggered 1411 for the device 106. The computing device 110 may instruct that the assigned storage bay 172 be unlocked 1412 so that the user may remove the device 106. The status of the storage bay 172 may be changed in the memory element 114 to reflect that it is unassigned. The user session may be ended—for example where the user has previously indicated no desire to purchase a new device 108. If the user has indicated that other transactions are desired and/or if the kiosk 102 still requires additional input regarding whether other transactions are desired, the computing device 110 may accordingly initiate one or more of such transactions and/or prompts.

If the determination 1410 is positive—indicating that the troubleshooting application properly resolved any deficiency(ies)—or if the determination 1408 was positive, the computing device 110 may instruct that the assigned storage bay 172 be locked and the diagnostic application be executed 1413.

The results of execution 1413 of the diagnostic application may include data permitting identification/categorization of certain aspects of the device 106 that are relevant—according to the kiosk software application and/or third party standards—to determination of a value for the device 106. For instance, the diagnostic application may contain instructions for running tests resulting in data indicating the processing speed, graphics display capability, data port integrity, touch screen integrity, peripheral device and camera functionality, and other characteristics of the individual device 106 which may differ from factory condition devices of the same type. It is foreseen that the camera 194 may be utilized to inspect the device 106 for visually perceptible variations from factory condition without departing from the spirit of the present inventive concept. Variations of these types may result from normal wear and tear, damage or the like.

The computing device 110 may generate 1414 an offer for display to the user at the user interface 104. The kiosk software application may generate 1414 the offer at least in part by accessing a pricing sheet—whether residing in the memory element 114 and/or a carrier server 116, 118 or trade-in partner database—indicating a value for each type of device that may be traded in at the kiosk 102. The pricing sheet may specify different values based on variation in detected qualities or status of the device 106 determined during execution 1413 of the diagnostic application outlined above. It is also foreseen that the kiosk software application may simply export all relevant data collected by the kiosk 102 to a third party server or the like so that a value or offer price may be returned by the third party server based on execution of calculations done remotely. It is foreseen that a combination of local and remote calculations may lead to generation of an offer price without departing from the spirit of the present inventive concept.

The computing device 110 may cause display 1415 of the offer to the user. The user may reject the offer displayed at the user interface 104. The computing device 110 may instruct that the assigned storage bay 172 be unlocked 1412 so that the user may remove the device 106. The status of the storage bay 172 may be changed in the memory element 114 to reflect that it is unassigned. The user session may be ended—for example where the user has previously indicated no desire to purchase a new device 108. If the user has indicated that other transactions are desired and/or if the kiosk 102 still requires additional input regarding whether other transactions are desired, the computing device 110 may accordingly initiate one or more of such transactions and/or prompts.

The user may accept the offer displayed 1415 at the user interface 104 for trade in of the device 106. This may lead to completion of the trade in transaction or portion of the transaction and the end of the user session or, preferably, to a new purchase transaction (as described below). Again, it is foreseen that new purchases and trade-in processes may be performed in varying orders without departing from the spirit of the present inventive concept.

It should be noted that, during the ongoing user session, the computing device 110 preferably stores in the memory element 114 the amount of the trade-in offer that the user accepted, if applicable, so that the amount may be applied 1416 as a credit toward any purchase, for example toward the purchase of a new device 108.

The computing device 110 of the kiosk 102 may cause the display 1417 of purchase options to the user at the user interface 104 to facilitate selection of a device 108. More particularly, the kiosk software application may instruct the display 1417 of listings of one or more mobile electronic device(s) 108 and associated pricing at the user interface 104 for selection/confirmation by the user (i.e., the purchase device confirmation process).

The user may select a device 108 to be purchased. The computing device 110 may cause the display 1418 of a prompt at the user interface 104 requesting that the user select whether or not a content and/or settings or the like are to be transferred to the new device 108. Optionally, the prompt may additionally request that the user specify whether data residing on the traded in device 106 should be transferred to a remote data server and/or to the new device 108. It is foreseen that the prompt for the user to make a data transfer request relating to the trade in device 106 may be made during the trade in process described above without departing from the spirit of the present inventive concept.

If the user selects an option for transferring data/settings to and/or from at least one device 106, 108, a sync record may be created 1419. The sync record preferably records the origin and destination of each transfer together with certain metadata regarding the data/settings transferred and the date/time of the transfer. In some instances, each sync record may also include a copy of the data/settings transferred. In conjunction with or in addition to such transfer(s), the kiosk 102 may perform additional configuration of the new device 108 prior to vending, for example to ensure proper activation and/or operation of the new device, including by taking into account details regarding the user, the user's account, and/or the technological and/or business-related requirements, parameters and/or settings required by an associated third party technology/service provider such as a telecommunications carrier. Such additional configuration may also be recorded in the sync record or another record. In most embodiments, transfers to and from and/or configuration of the new device 108 will be preceded by instructions issued by the computing device 110 to the user for unwrapping the device 108 from any packaging, turning the device 108 on, and preparing the device for such transfer(s) and/or configuration (for example, by returning the device 108 to the vending bay 154 and connecting it to the plug 171).

The computing device 110 preferably generates 1420 a final price for the transaction to be completed. Preferably, the final price includes a credit for the agreed upon amount (see step 1415 described above) to be paid for the trade in device 106 as well as the price for the selected device 108 to be purchased. The final price may also or alternatively incorporate any additional services the user may have selected and purchased that were, for example, offered on behalf of a third party telecommunications carrier and/or any additional unrelated goods and/or services the user may have selected that were offered to the user, for example via secondary video devices according to embodiments of the present inventive concept.

The computing device 110 may issue instructions for display 1421 of a prompt at the user interface 104 requesting confirmation of the transaction terms—including the final price—by the user. If the terms are rejected, the user may be prompted to identify one or more items to be removed from the transaction to permit it to proceed. It is foreseen that certain items—for example the amount offered for the trade in device 106—may be contingent on other items such as the purchase of a certain type of new device 108. Therefore, the ability of the user to add or remove items from the final transaction may be limited. More broadly, if the terms of the transaction are not agreed upon, the computing device 110 may issue instructions that the assigned storage bay 172, if any, be unlocked 1422 and that a prompt be displayed 1423 at the user interface 104 requesting retrieval of the trade in device 106. If no items of the proposed transaction are to be carried to completion, the computing device 110 may instruct 1424 that the transaction be voided.

If a set of transaction terms are agreed to by the user, the computing device 110 may execute 1425 or request execution of a payment and billing application to complete the transaction and transmit records relating to same. In an embodiment, the computing device 110 may bill or request billing to a user's account by communicating the details of the transaction to at least one of the carrier servers 116, 118, in addition to or in lieu of taking other forms of payment at the kiosk 102.

If the device 108 is being held in the kiosk 102, the computing device 110 may also instruct vending 1426 of the purchased device 108 via vending bay 154. The computing device 110 may also instruct that a receipt be e-mailed 1427 to a user e-mail address and/or be printed for the user. The computing device 110 may also instruct that the traded in device 106 be wiped to place its software and memory elements in a factory condition, for example. The computing device 110 may update its inventory records to reflect the possession and ownership changes relating to the traded in device 106. To the extent automatic uploading of details regarding the transaction(s) has not already occurred, the computing device 110 may initiate and/or schedule such data transfer so that remote servers, applications and databases— for example, billing and transaction databases, carrier service databases and remote kiosk coordination servers—may reconcile records accordingly.

The system and method so described offers a number of advantages over existing systems. For instance, use of the automated kiosk preferably mitigates procedural, factual and/or judgmental errors experienced in current systems by enforcing adherence to policy, criteria for evaluation and pricing and systematic processing. The reduction in variance experienced by implementing systems according to embodiments of the present inventive concept may also permit the computing device of the kiosk to identify and correct system errors and inadequate or inaccurate policies. In the preferred embodiment, through centralized completion of the transaction(s) outlined or understood from review of the above, storage of resulting transaction data in a preferably uniform structured data format, and organized and regular distribution of the transaction data to various stakeholders, users may have improved user experiences, record errors may be reduced, and time and labor may be saved.

One or more of the foregoing steps may optionally be implemented in conjunction with and/or through execution of a machine learning program. The machine learning program may include curve fitting, regression model builders, convolutional or deep learning neural networks, Bayesian machine learning techniques, or the like. The machine learning program may associate patterns from prior transactions with known errors to inform generation of error prediction indicators, iteratively improve the operation of the kiosk, and the like.

Preferably, a machine learning program residing on a memory associated with the computing device 110 may be trained to determine the occurrence of such errors, based upon historical data regarding prior transactions occurring at the kiosk(s) and any post-transaction data that may be available. After which, newly received requests and transactions may be input by the computing device 110 into the trained machine learning program for improved treatment of such requests. The kiosk may also predictively offer or suggest additional transactions based on previous transaction history, or the aggregation of information elements gathered during previous transactions.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

The invention claimed is:

1. A computer-implemented method for reverse-vending a mobile electronic device and completing a sale transaction at a kiosk, the computer-implemented method comprising:
   establishing, via a communication element of the kiosk, a data connection with the mobile electronic device;
   executing, via a processing element of the kiosk, a diagnostic application;
   determining, from execution of the diagnostic application, at least one characteristic of the mobile electronic device;
   comparing, via the processing element, the at least one characteristic of the mobile electronic device against an electronic pricing sheet;
   generating, via the processing element, a purchase offer for the mobile electronic device based at least in part on the comparison against the electronic pricing sheet;
   generating, via the processing element, a sale offer in connection with vending a new mobile electronic device for display at the kiosk;
   establishing a data connection with the new mobile electronic device via an electrical connector positioned at least partly in a vending bay of the kiosk;
   transferring to the new mobile electronic device at least one of (a) data from the mobile electronic device, and (b) activation data; and
   applying, via the processing element, the purchase offer as a credit toward the sale offer in connection with completion of a commercial transaction.

2. The computer-implemented method of claim 1, further comprising completing, via the processing element, a sign-in process to verify the identity of a user prior to the completion of the commercial transaction.

3. The computer-implemented method of claim 1, further comprising checking, via the processing element, eligibility of the mobile electronic device for trade in prior to the completion of the commercial transaction.

4. The computer-implemented method of claim 1, wherein the data connection with the mobile electronic device is established through a diagnostic cable wire harness.

5. The computer-implemented method of claim 1, further comprising checking, via the processing element, the data connection with the mobile electronic device and executing, via the processing element, a troubleshooting application if the data connection is determined insufficient.

6. The computer-implemented method of claim 1, further comprising transferring, via the communication element, data from the mobile electronic device for storage and generating, via the processing element, a sync record including metadata regarding the transfer.

7. The computer-implemented method of claim 1, further comprising locking, via the processing element, a storage bay to store the mobile electronic device.

8. A computer-implemented method for reverse-vending a mobile electronic device and completing a sale transaction at a kiosk, the computer-implemented method comprising:
   establishing, via a communication element of the kiosk, a data connection with the mobile electronic device;
   executing, via a processing element of the kiosk, a diagnostic application;
   determining, from execution of the diagnostic application, at least one characteristic of the mobile electronic device;
   comparing, via the processing element, the at least one characteristic of the mobile electronic device against an electronic pricing sheet;
   generating, via the processing element, a purchase offer for the mobile electronic device based at least in part on the comparison against the electronic pricing sheet;
   generating, via the processing element, a sale offer for display at the kiosk; and
   applying, via the processing element, the purchase offer as a credit toward the sale offer in connection with completion of a commercial transaction,
      wherein the data connection with the mobile electronic device is established through a diagnostic cable wire harness, the kiosk includes a storage bay to store the mobile electronic device as well as a plurality of additional storage bays, and the diagnostic cable wire harness is configured for automated transition between the storage bay and the plurality of additional storage bays.

9. A kiosk for reverse-vending a mobile electronic device and completing a sale transaction, comprising:
   one or more processors;
   a communication element;
   non-transitory computer-readable storage media having computer-executable instructions stored thereon, wherein when executed by the one or more processors the computer-readable instructions cause the one or more processors to—
      establish, via the communication element, a data connection with the mobile electronic device;
      execute a diagnostic application;
      determine, from execution of the diagnostic application, at least one characteristic of the mobile electronic device;
      compare the at least one characteristic of the mobile electronic device against an electronic pricing sheet;
      generate a purchase offer for the mobile electronic device based at least in part on the comparison against the electronic pricing sheet;
      generate a sale offer in connection with vending a new mobile electronic device for display at the kiosk;
      establish a data connection with the new mobile electronic device via an electrical connector positioned at least partly in a vending bay of the kiosk;
      transfer to the new mobile electronic device at least one of (a) data from the mobile electronic device, and (b) activation data; and
      apply the purchase offer as a credit toward the sale offer in connection with completion of a commercial transaction.

10. The kiosk of claim 9, wherein the computer-executable instructions further cause the at least one processor to complete a sign-in process to verify the identity of a user prior to the completion of the commercial transaction.

11. The kiosk of claim 9, wherein the computer-executable instructions further cause the at least one processor to check eligibility of the mobile electronic device for trade in prior to the completion of the commercial transaction.

12. The kiosk of claim 9, wherein the data connection with the mobile electronic device is established through a diagnostic cable wire harness of the kiosk.

13. The kiosk of claim 9, wherein the computer-executable instructions further cause the at least one processor to check the data connection with the mobile electronic device and execute a troubleshooting application if the data connection is determined insufficient.

14. The kiosk of claim 9, wherein the computer-executable instructions further cause the at least one processor to transfer, via the communication element, data from the mobile electronic device for storage and generate a sync record including metadata regarding the transfer.

15. The kiosk of claim 9, wherein the computer-executable instructions further cause the at least one processor to lock a storage bay to store the mobile electronic device.

16. A kiosk for reverse-vending a mobile electronic device and completing a sale transaction, comprising:
   one or more processors;
   a communication element;
   non-transitory computer-readable storage media having computer-executable instructions stored thereon, wherein when executed by the one or more processors the computer-readable instructions cause the one or more processors to—
   establish, via the communication element, a data connection with the mobile electronic device;
   execute a diagnostic application;
   determine, from execution of the diagnostic application, at least one characteristic of the mobile electronic device;
   compare the at least one characteristic of the mobile electronic device against an electronic pricing sheet;
   generate a purchase offer for the mobile electronic device based at least in part on the comparison against the electronic pricing sheet;
   generate a sale offer for display at the kiosk; and
   apply the purchase offer as a credit toward the sale offer in connection with completion of a commercial transaction,
      wherein the data connection with the mobile electronic device is established through a diagnostic cable wire harness, the kiosk includes a storage bay to store the mobile electronic device as well as a plurality of additional storage bays, and the diagnostic cable wire harness is configured for automated transition between the storage bay and the plurality of additional storage bays.

\* \* \* \* \*